US007356483B2

(12) United States Patent
Shirley et al.

(10) Patent No.: US 7,356,483 B2
(45) Date of Patent: Apr. 8, 2008

(54) REQUEST FOR CONFORMITY SYSTEM

(75) Inventors: David P. Shirley, Des Moines, WA (US); Dale P. Olson, Sumner, WA (US); Eric C. Jacobs, Auburn, WA (US); E-Song Lin, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 1247 days.

(21) Appl. No.: 10/222,416

(22) Filed: Aug. 16, 2002

(65) Prior Publication Data

US 2004/0034554 A1 Feb. 19, 2004

(51) Int. Cl.
*G06Q 10/00* (2006.01)
(52) U.S. Cl. .......................... 705/8; 707/104.1
(58) Field of Classification Search ............... 705/7–9; 707/104.1
See application file for complete search history.

(56) References Cited

U.S. PATENT DOCUMENTS

| 5,778,381 | A | * | 7/1998 | Sandifer ................... 707/104.1 |
| 5,828,969 | A | * | 10/1998 | Chamney et al. ............. 701/29 |
| 6,006,171 | A | * | 12/1999 | Vines et al. ................. 702/184 |
| 6,691,006 | B2 | * | 2/2004 | Sinex ........................... 701/29 |

FOREIGN PATENT DOCUMENTS

JP 2002197262 A * 7/2002

OTHER PUBLICATIONS

Order 1370.79 FAA Internet Policy of Nov. 8, 1996, retrieved from the web at: www.tc.faa.gov/messages/iordermain.htm, pp. 1-6.*
Tidal Wave of Wiring Requirements to hit Industry Air Safety Week, v16, n27, p NA Jul. 15, 2002, Dialog 09924121 89010009.*
Careful Kaman, Flight International, p. 54, Sep. 7, 1994, Dialog 03546123 Supplier No. 44978433.*
"Shops, OEMs Squeeze in RVSM Work: Long-range business jet owners and service shops are rushing to modify aircraft to comply with reduced vertical separation minimum guidelines." Paul Seidenman & David Spanovich, Overhaul & Maintenance, vol. VII, No. 5, p. 53, Jun. 2001, Dialog 01177800.*

(Continued)

*Primary Examiner*—Beth Van Doren
*Assistant Examiner*—Jonathan G Sterrett
(74) *Attorney, Agent, or Firm*—Lee & Hayes, PLLC

(57) ABSTRACT

A system and method are provided for facilitating regulatory certification of an aircraft system. The invention provides automated completion and submission of all the designee forms, including: 8110-1 Test Inspection Authorizations (TIA); 8100-1 Conformity Inspection Records; 8130-9 Statements of Conformity; and 8130-3 Airworthiness Approval Tags.

In an exemplary method, one or more components that require certification activity are entered. Based on the entered one or more components, appropriate parties to supply certification activity based on the entered one or more components are automatically identified, and one of the identified parties to perform the certification activity is assigned. If desired, the performed certification activity is received from the assigned party. The performed certification activity is complied into a report, and an interactive display of the compiled report is generated for review.

29 Claims, 17 Drawing Sheets

OTHER PUBLICATIONS

"Close call: An aircraft maintenance human factors tale" Anonymous. Flying Safety. Washington: Aug. 2001.vol. 57, Iss. 8; p. 8, 2 pgs, ProQuest ID 78342183.*

"FAA approval for Kestrel" Anonymous. Air Progress. Canoga Park: Jun. 1997. vol. 59, Iss. 2; p. 19 (1 page), ProQuest ID 12500463.*

Gormley, Mal; "Electronic Maintenance Management Systems", Apr. 1998, Business & Commercial Aviation, vol. 82, No. 4, p. 92, Dialog 00929900.*

"Complete FAR part 135 Air Carrier Certification with your own Operations Manuals", web.archive.org webpage of Aug. 2, 2002, www.air-compliance.com, pp. 1.*

* cited by examiner

REQUEST FOR CONFORMITY SYSTEM

FIELD OF THE INVENTION

This invention relates generally to data collection and, more specifically, to automated web-based data collection.

BACKGROUND OF THE INVENTION

In the Federal Aviation Act of 1958, a complex multi-step approval/certification process was established for the Federal Aviation Administration (FAA) to follow to ensure that civil aircraft meet minimum safety requirements. These regulations are found in 14 Code of Federal Regulations (CFR), which comprise the Federal Aviation Regulations (FARs).

The regulatory requirements that civil aircraft must meet depend on the type of aircraft involved (i.e., light airplanes, large multi-passenger airplanes, helicopters, etc.) and the aircraft's intended use (i.e., private, crop dusting, airline, external load-bearing helicopters, etc.). The basic premise of the regulations is that the FAA must certify each aircraft with an eye toward assuring adequate testing so as to prevent a component, a modification, or an aircraft from becoming a potential hazard to passengers or to others. Except for "public aircraft" (i.e., those operated by the federal, state, or local government), all civil aircraft must be approved by the FAA before they can be placed into any service. To acquire the necessary approvals, the builder or the operator must demonstrate to the FAA, via the multi-step approval process, that the aircraft complies with appropriate regulatory requirements.

The FAA conducts all of the various testing steps in the approval process. To that end, the FAA reviews and approves designs, test and production hardware, and test plans; witnesses tests; and approves test data. The primary responsibility for carrying out the necessary demonstrations of compliance lies with aircraft manufacturers and operators. Manufacturers perform some of the approval steps and aircraft operators perform the others.

Aircraft type certification is the process by which the FAA evaluates and approves aircraft type design data against designated airworthiness standards, culminating in the initial issuing of a Type Certification (TC). It is a prerequisite for the issue of a Certificate of Airworthiness (CoA) for an individual aircraft. Subsequently, an aircraft manufacturer may amend the TC or apply for supplemental type certifications (STCs). STCs are issued when the manufacturer proposes major changes.

Aviation Safety Inspectors (ASIs) make conformity inspections as a part of two higher-level processes—Type Certification and Production Certification. A conformity inspection is a process of assigning suitable testing of the subject assembly, reviewing the results of the assigned testing, and certifying the part as air-worthy. A conformity inspection may satisfy either of these processes. Conformity inspections are generally required for the following purposes:

(a) Conformity inspection on Prototype Parts, Installations or Aircraft;
(b) Conformity inspection on Test Articles and Test Setups;
(c) Ground Inspections and Type Inspection Authorizations conducted on prototype aircraft, major modifications and STCs;
(d) Conformity inspection on production parts, assemblies or aircraft;
(e) Engine tear down inspections; and
(f) Bilateral conformity inspections performed for other CAA authorities.

The FAA conducts Conformity Inspections during the manufacturing phase of prototype aircraft to:

(a) Verify and provide objective documentation to the FAA that test articles, parts, assemblies, installations, functions and test setups conform to the design and attributes that are specified;
(b) Provide the basis which enables the Manufacturing Inspector or designee to accept an FAA Form 8130-9, Statement of Conformity prior to turnover of the aircraft to Flight Test as required by FAR 21.33(a)(1) and 21.35(a)(3);
(c) Provide part of the basis for granting a Production Certificate (upon issuance of the Type Certificate) per FAR 21.135 and 21.153;
(d) Provide part of the basis which enables the Manufacturing Inspector or designee to issue and maintain an Experimental Certificate of Airworthiness for the prototype aircraft prior to flight as required by FAR 21.191, FAR 21.193, FAR 21.195, FAR 21.441;
(e) Provide part of the basis that enables the Manufacturing Inspector to issue a Standard Certificate of Airworthiness on a prototype aircraft after issuance of a TC/STC/PC; and
(f) Ensure any process/manufacturing concerns that are raised during the manufacturing/assembly process are corrected.

The FAA also issues Type Acceptance Certificates (TACs), which have the force of a TC, for aircraft imported from a recognized country and TCs for aircraft imported from a non-recognized country.

Type certification (including supplemental type certification and other approval of major modifications) of an aircraft, aircraft engine, or propeller involves:

(a) Prescribing appropriate design standards and requirements;
(b) Ensuring that the product design is proven to meet the design standards, through competent and adequate ground tests, engineering analysis and flight tests;
(c) Checking that the test articles, when manufactured, conform to the design requirements;
(d) Ensuring that the Aircraft Flight Manual (AFM) and associated operating aspects are satisfactory;
(e) Accepting the maintenance manual and approving the Airworthiness Limitations Section of the maintenance manual (if applicable); and
(f) Ensuring that the manufacturer has satisfactory arrangements in place for continuing airworthiness control, defect reporting and supply of service documents.

Over what is typically a three to five year process, the manufacturer must supply the FAA with detailed analyses as well as produce a prototype of the aircraft. Because the FAA cannot perform all of the analysis necessary to examine the prototype, the Federal Aviation Act of 1958 allowed the FAA to delegate activities, as the agency deems necessary. The FAA delegates activities to approved private persons, known as designees, employed by aircraft manufacturers to perform such analysis. Although paid by the manufacturers, these designees act as surrogates for the FAA in examining aircraft designs, production quality, and airworthiness. The FAA is responsible for overseeing the designees' activities and determining whether the designs meet the FAA's requirements for safety.

During type certification (TC) programs, the applicant's designated engineering representative (DER) generates a request for conformity (RFC), a FAA Form 8120-10. A request for conformity is the notification to the FAA that a conformity inspection is necessary. The request for conformity is typically routed through the Aircraft Certification Office (ACO) for approval; to the manufacturing specialist (in some locations) for tracking and routing; to the Manufacturing Inspection District Office (MIDO) principal inspector (PI) for review; and finally to the designated inspection representative for accomplishment of the inspection. The same process, in reverse, returns a completed conformity request through the same personnel before final closure.

The functional roles and responsibilities for designees are set forth in FAA Order 8110.37 for Designated Engineering Representatives and 8130.28 for Designated Manufacturing Inspection Representatives, Designated Airworthiness Representatives, and Organizational Designated Airworthiness Representatives. The ACO defines the method for tracking all conformity requests and maintaining a master list. The DER coordinator will control any tracking performed by the applicant on behalf of the FAA. In general, the criteria for determining ACO and MIDO involvement in requests for conformity inspections has been based on previous designee performance, applicant experience, designee expertise, part criticality, and the history of unsatisfactory/satisfactory findings, as referenced in FAA Order 8110.4A.

FIG. 1 is an information flow chart portraying the existing process for an FAA request for conformity (RFC) or a type inspection authorization (TIA). FIG. 1 depicts a circuitous process of conformity inspections involving several cooperating parties in communication and negotiation.

Conformity inspections are required to verify that an aircraft component or modification conforms to the data submitted to the FAA, and that the product being certificated complies with the Type design. These inspections physically compare the component or modification to the engineering specifications, drawings, and the airworthiness standards. Conformity inspections are initiated by filling out FAA Form 8110-1, Type Inspection Authorization or FAA Form 8120-10, Request for Conformity, and submitting it to the MIDO through the ACO project engineer. Conformity inspections are recorded and reported on FAA Form 8100-1, and FAA Form 8130-3 is completed if required.

A process 60 of requesting a conformity inspection begins when an Aviation Safety Engineer (ASE) or a Designated Engineering Representative (DER) receives a request for an inspection at a block 63. Either an FAA Form 8120-10 (RFC), or an FAA Form 8110-1 (TIA), serves as the internal FAA document to track the progress toward certification. At a block 69, the Aircraft Certification Office (ACO), the Manufacturing Inspection District Office (MIDO), or the Certificate Management Office (CMO) examines the form, approves it, and passes it to either and ASE or DER to request the inspection. The ASE or DER will review the document for completeness and apparent inconsistencies. If forms are appropriate, then the request is logged into the FAA system within the ACO at the block 69. FAA Designated Regulatory Office (DRO or FAADRO) might stand-in for the ACO.

Logging the request for inspection into the FAA notifies the MIDO or CMO that the application is in the system. The MIDO or CMO is included in the coordination process for reviewing all RFCs and TIAs. After the ACO/MIDO/CMO review the RFC or the TIA, either a MIDO or a CMO tracking number will be assigned to each form. Only with this tracking number do the forms become FAA-approved. In the course of the conformity process, there may be several revisions and retesting iterations under a single request and, therefore, a single FAA project number. Usually there is one FAA project number, but numerous conformity requests issued under that project number and the MIDO or CMO tracking number is a sequential number used for tracking each request. All RFCs and TIAs must be reviewed and approved by the ACO or authorized DER before release.

At a block 72, the applicant performs a conformity inspection. Depending upon whether the applicant seeks a statement of conformity for a part or an installation, the applicant then presents the inspection documentation to a conformity inspector at either a block 75 for parts or a block 78 for installation. The applicant selects an appropriate conformity inspector. The Conformity Inspector is either an Aviation Safety Inspector (Manufacturing), an FAA authorized Designated Manufacturing Inspection Representatives (DMIR), or a manufacturing Designated Airworthiness Representatives (DARs). FAA Manufacturing Aviation Safety Inspectors are located at various MIDOs throughout the certifying directorate. When a conformity inspection is conducted outside the certificating directorate, an FAA Form 8120-10 or FAA Form 8110-1 (with all pertinent information) are forwarded by the Manufacturing Inspection Specialist to the MIDO being requested to conduct the conformity. Once the inspection has been delegated, it is the responsibility of the ASI or Designee assigned to the conformity inspection to contact the ASE/ASI project manager for resolving any questionable items.

At a block 81, the MIDO, CMO and ACO will track the initiation and completion of the Conformity Inspection Record (CIRs) and TIAs. Each ASI periodically follows-up with their designees to ensure there are no problems and that each CIR or TIA is completed on time. The purpose of checking the status is to ensure that the designees are completing the required documentation in time for Type Certification or Part Certification approval. Conformity requests may be coordinated directly between district offices within the certificating Directorate.

The approved RFC or TIA is forwarded to the appropriate MIDO/CMO/CAA/Designee. The RFC can be sent by FAX, electronic mail, or regular mail—whichever way is most favorable to the project schedule completing the conformity process 60.

As is evident, the process 60 is both long and requires many people in official capacities to be aware of the status of the process. Because the process 60 is currently paper-based, it lacks an easy means of simultaneously reporting the application status to each of the interested parties.

Traditionally, the collection, assembly, compiling, and routing of an RFC has been a tremendously laborious task. The RFCs have all been paper printouts with paper endorsements. As a result, the process has been lengthy and labor intensive. Only one party holds the RFC package at any given time and only the holder of the RFC package accurately knows the status of any RFC. Where testing data is a part of the required content of the request, the applicant must unite the date to the administrative application. As a result of adherence to such a paper-based process, several inefficiencies and opportunities for misplacement of paper are introduced.

There exists, therefore, an unmet need for an automated means of assembly, promulgation, and review of requests for conformity.

SUMMARY OF THE INVENTION

A system and method are provided for facilitating regulatory certification of an aircraft system. The invention provides automated completion and submission of all the designee forms, including: 8110-1 Test Inspection Authorizations (TIA); 8100-1 Conformity Inspection Records; 8130-9 Statements of Conformity; and 8130-3 Airworthiness Approval Tags.

In an exemplary method, one or more components that require certification activity are entered. Based on the entered one or more components, appropriate parties to supply certification activity based on the entered one or more components are automatically identified, and one of the identified parties to perform the certification activity is assigned. If desired, the performed certification activity is received from the assigned party. The performed certification activity is compiled into a report, and an interactive display of the compiled report is generated for review.

In accordance with further aspects of the invention, an exemplary graphical user interface is embodied in an active web page. The interface allows Web-browser based interaction with a backend database. In accordance with other aspects of the invention, "business rules" are imposed upon the input screens to facilitate correct data entry.

Further, optimal web-page front-end screens allow worldwide usage by diverse clients. The inventive system is intuitive and familiar to users of the Internet and the attendant browsers, thereby reducing training overhead to users.

In accordance with yet other aspects of the invention, the application process is web-based and e-mail driven. Steps in the process are suitably affected through use of digital signatures to verify data. Internet architecture allows worldwide interaction with the application while preventing unauthorized tampering with the application through existing security.

Furthermore, on-line functionality allows several interested parties to browse data in real-time, while retaining historical data submissions constituting the real time data. Such interested parties may include the FAA in its various offices and officers, Designated Engineering Representatives, and Quality Assurance designees.

BRIEF DESCRIPTION OF THE DRAWINGS

The preferred and alternative embodiments of the present invention are described in detail below with reference to the following drawings.

FIG. 13 is a screen shot of the interactive display of an 8120-10 form;

FIG. 15 is a screen shot of the interactive display of an 8120-10 form displaying a dialogue box indicative of the remarks that will not be included in the formal 8120-10;

DETAILED DESCRIPTION OF THE INVENTION

A system and method are provided for facilitating regulatory certification of an aircraft system. The invention provides automated completion and submission of all the designee forms, including: 8110-1 Test Inspection Authorizations (TIA); 8100-1 Conformity Inspection Records; 8130-9 Statements of Conformity; and 8130-3 Airworthiness Approval Tags.

In an exemplary method, one or more components that require certification activity are entered. Based on the entered one or more components, appropriate parties to supply certification activity based on the entered one or more components are automatically identified, and one of the identified parties to perform the certification activity is assigned. If desired, the performed certification activity is received from the assigned party. The performed certification activity is compiled into a report, and an interactive display of the compiled report is generated for review.

The following discussion is intended to provide a general description of a suitable computing environment in which the invention may be implemented. While the invention will be described in the general context of an application program that runs on an operating system in conjunction with a personal computer and in connection with a server, those skilled in the art will recognize that the invention also may be implemented in combination with other program modules. Generally, program modules include routines, operating systems, application programs, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

Figure 2:
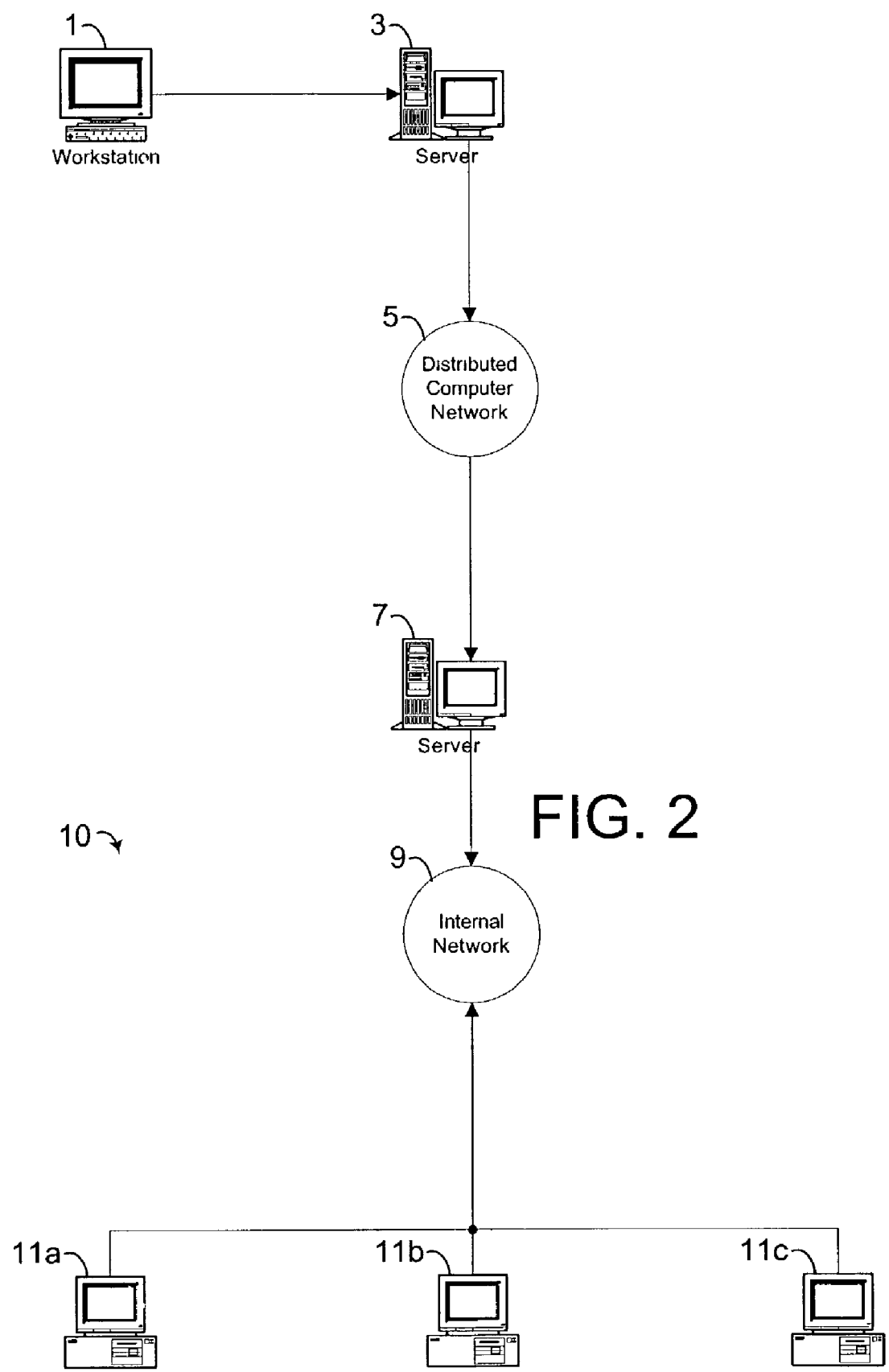
FIG. 2 shows an exemplary network for hosting the invention.

FIG. 2 illustrates a typical client-server environment 10 in which an exemplary embodiment of the present invention operates. A computer system or client 1, such as a conventional personal computer or any device operable to communicate over a network, is connected to an Internet server computer 3 ("server"). The server 3 is generally provided by an Internet service provider (ISP), which provides Internet access for a typical Internet user. The server 3 is connected to a distributed computer network 5, such as the Internet or a wide-area network ("WAN"), and enables the client 1 to communicate via the distributed computer network 5.

The client 1 communicates via the combination of the server 3 and the distributed computer network 5 to a server 7, such as a communication or an e-mail server. In an exemplary embodiment, the servers 3 and 7 support e-mail services, contain a message store for holding messages until delivery, and contain a translation facility or gateway for allowing users having different e-mail programs to exchange mail. The server 7 is connected to an internal network 9, such as a local-area network ("LAN") and enables the client 1 to communicate with the clients 11a, 11b, and 11c via the internal network 9.

The clients 11a, 11b, and 11c are not only able to respond to a communication from the client 1, but are also able to initiate communication with the client 1. The clients 11a, 11b, and 11c can send information via the internal network 9 to the server 7. The server 7, in turn, forwards the information to the client 1 via the distributed computer network 5. The information is retrieved by the server 3 and can be forwarded to the client 1, when requested by the client 1.

Figure 1:
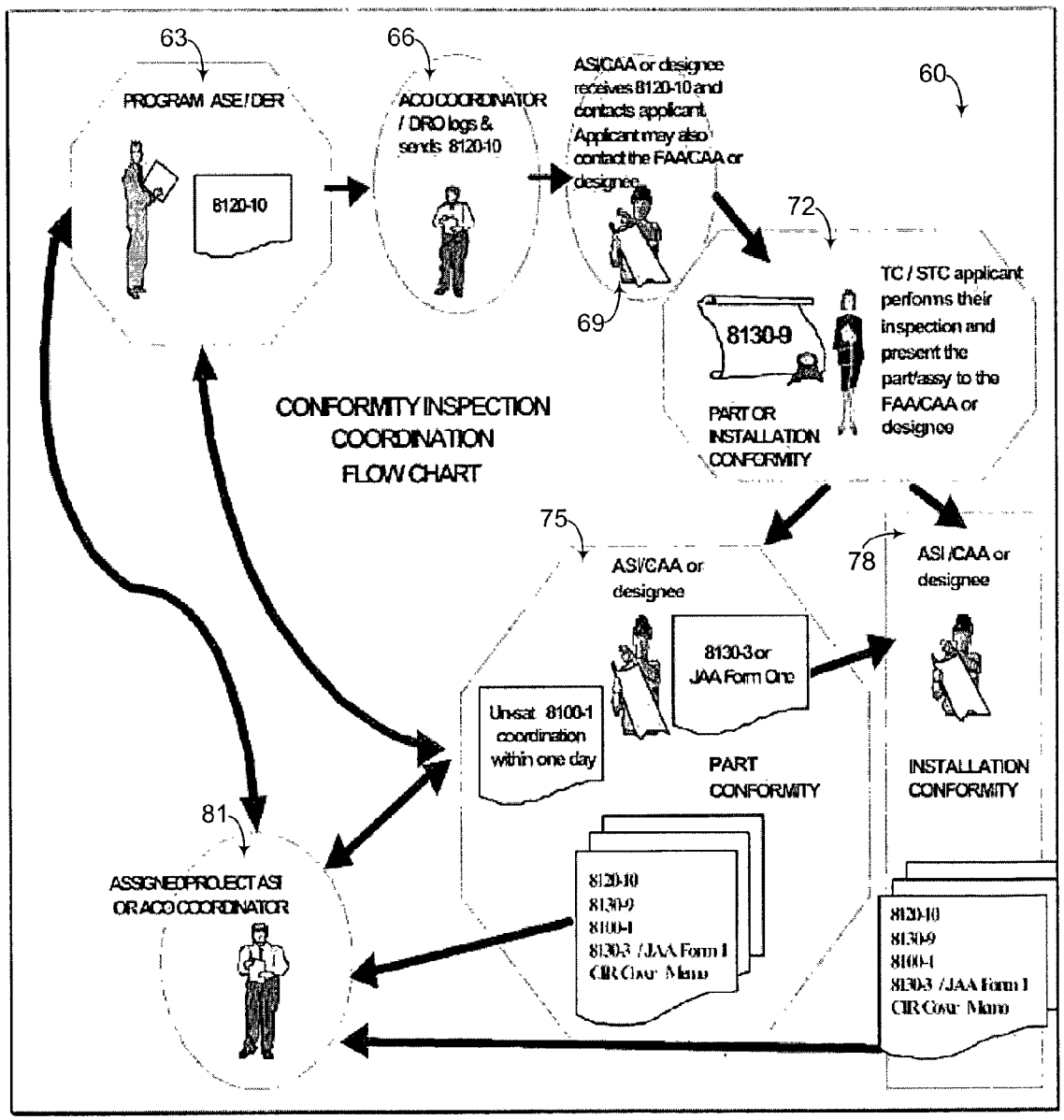
FIG. 1 shows a prior art data exchange flow diagram.
Figure 3:
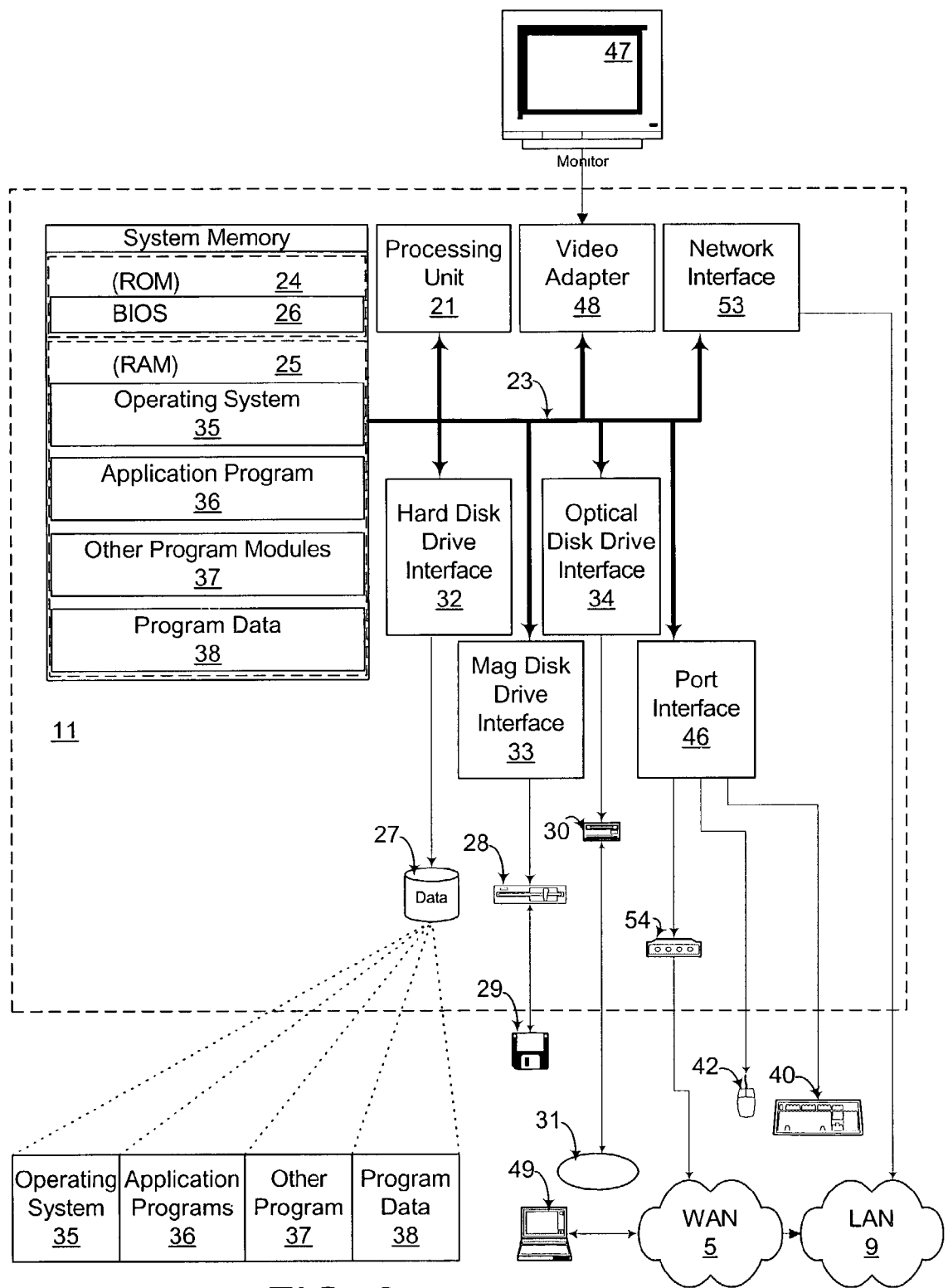
FIG. 3 shows an exemplary client computer on the network displayed in FIG. 1.

With reference to FIG. 3, an exemplary system for implementing the invention includes a conventional personal computer 11, which serves as a client. The client 11 may represent any or all of the clients 1, 11a, 11b, and 11c illustrated in FIG. 1. The client 11 includes a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the client 11, such as during start-up, is stored in ROM 24. The client 11 further includes a hard disk drive 27, a magnetic disk drive 28, e.g., to read from or write to a removable disk 29, and an optical disk drive 30, e.g., for reading a CD-ROM disk 31 or to read from or write to other media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the client 11. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs, such as an e-mail program module 36, other program modules, such as a message manager program module 37, a local message store 38, and a database 39 for supporting e-mail applications. A user may enter commands and information into the client 11 through a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a port interface 46 that is coupled to the system bus, but may be connected by other interfaces, such as a serial port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The client 11 operates typically in a networked environment using logical connections to one or more remote computers, such as a remote computer 49. The remote computer 49 may be an e-mail server (which includes one or more message stores), as described above in connection with FIG. 2, a file server (which includes one or more file stores), a router, a peer device or other common network node, and typically includes many or all of the elements described relative to the client 11. The logical connections depicted in FIG. 2 include the local area network (LAN) 9 or the wide area network (WAN) 5. Such networking environments are commonplace in offices, enterprise-wide computer networks, intranets and the Internet.

When used in a LAN networking environment, the client 11 is connected to the LAN 9 through a network interface 53 or additionally through the WAN 5. When used in a WAN networking environment, the client 11 typically includes a modem 54 or other means for establishing communications over the WAN 5, such as the Internet. The modem 54, which may be internal or external, is connected to the system bus 23 via the serial port interface 46. In a networked environment, program modules depicted relative to the client 11, or portions thereof, may be stored in the remote memory storage device. It will be appreciated that the network connections shown are exemplary and other means of establishing a communications link between the computers may be used.

A presently preferred embodiment of the invention automates the collation and compiling of information, presenting the information to interested parties through a browser-based front end. Designed databases of a presently preferred embodiment are well-suited information storage and the browser-based front end suitably promulgates the information with appropriate security.

Figure 4:
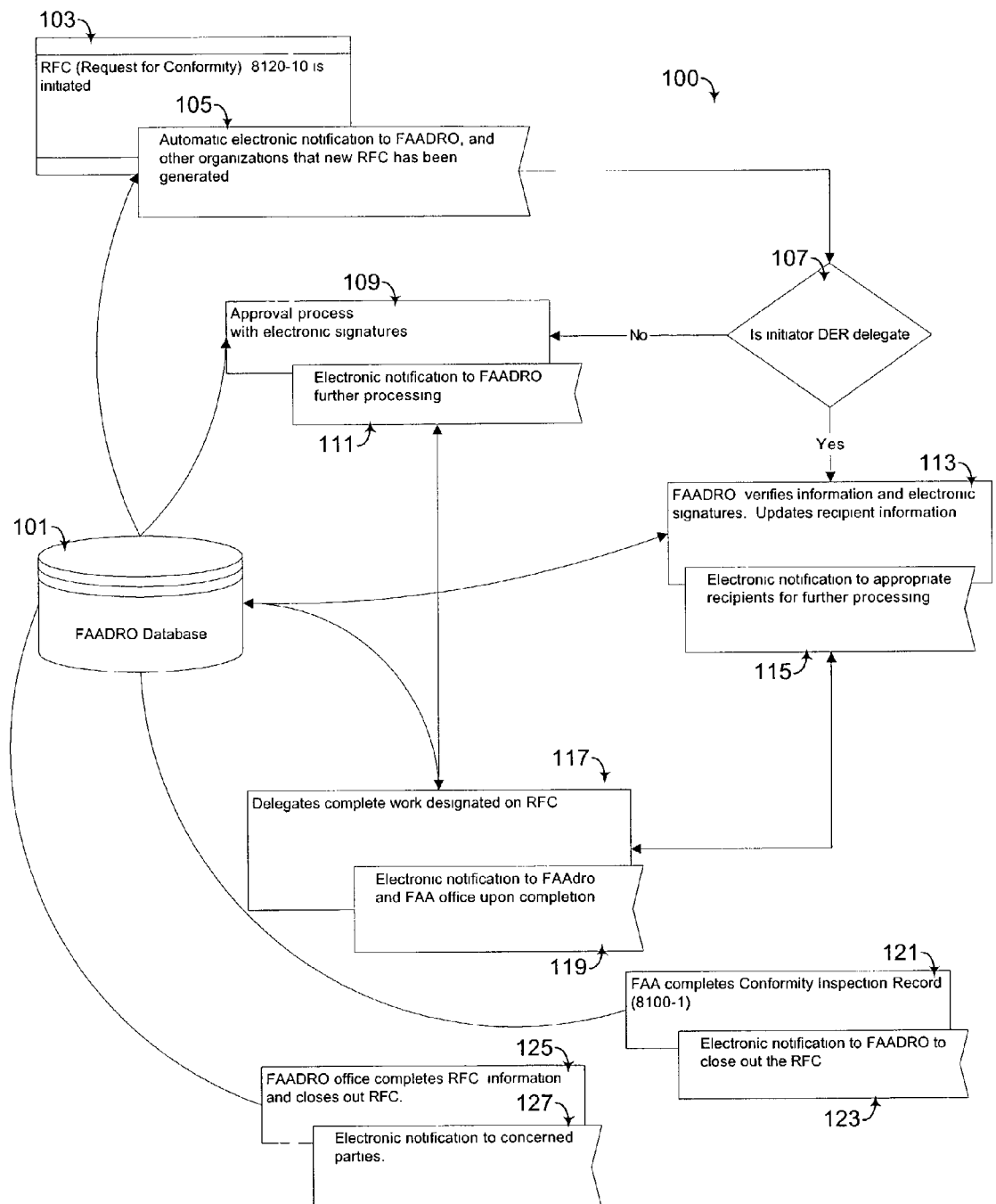
FIG. 4 shows a data exchange flow diagram.

FIG. 4 illustrates, by way of overview, functionality of a routine 100 of a presently preferred embodiment of the present invention. Among the functions suitably included in the preferred embodiment are use of Electronic Signatures; automated E-mail notification to interested parties of inspection events; direct access to data for review or augmentation (with security, i.e. read or write privileges, based upon the log-on identity of the user; fax notification capability to augment the e-mail and Web-based access; original or draft electronic stamp on printed copies (watermark); reverse proxy for outside users; and the ability to archive closed RFCs for later access. Those skilled in the art will readily appreciate that each of these are features that are readily incorporated into the "front-end" of a web-based database system.

The hub of the present invention is the database 101. In a presently preferred embodiment the database 101 is suitably a relational database with the capability of compiling completed forms. Any of several commercial-off-the-shelf software products have the appropriate functionality, though persons skilled in the art are also familiar with routines necessary to construct such a database.

At a block 103, a user initiates a record in the database, after appropriate log-on. Each Request for Conformity (RFC) is a distinct record in the database. The user suitably logs in the appropriate identification data by means of an acceptable interface, such as a graphical user interface.

Internal business rules for the database 101 assure data integrity upon entry. Such rules promote rapid and accurate data entry. Existing identity data for all known parties that might participate in the process is stored in the database 101, and entry is speeded by merely establishing the appropriate relationship between the record and the party defining an appropriate role.

Upon completion of each entry, at a block 105, the database 101 assigns a unique identifier number and transmits an electronic notification to the FAA or to a Designated Regulatory Office, the FAA delegates its responsibility to determine whether parts conform and to manage this process on behalf of the FAA to the DRO. Based upon the log-on, at a block 107, the database decides whether the FAA has granted the user DER privileges.

If the user is not a DER, then at a block 109 the user will proceed with the approval process, garnering electronic signatures from each of the various inspectors or testers, or the approved FAA designees. At each step of the approval process, the completion of the step suitably triggers an email notification or notification by fax (block 111) as desired to alert all of the relevant parties of the status and such information as the rules of the database 101 deem relevant to the individual party.

Where the user is a DER, FAA regulations and orders allow the DER a great deal more involvement in the actual inspection process. As is known, DER expedites the certification process by approving data (drawings, reports, etc.) or recommending approval of data (test plans, certification plans, test results, etc.), thus saving the applicant time and money by providing expertise concerning federal aviation regulations (FAR). The DER will provide the testing results with endorsement by using the graphical user interface (block 113). When the DER review of the information is complete, at a block 115 the database triggers another email notification or notification by fax to alert all of the relevant parties of the status and such information as the rules of the database 101 deem relevant to the individual party.

At a block 117, the delegates complete or oversee the completion of any necessary work in response to the application. All of the results are entered into the database 101. Once entry is complete, at a block 119, the database compiles the information into appropriate FAA-required forms, sending the same to the FAA and to the DRO for review. The database 101 is enabled to transmit the forms to the FAA by e-mail, by fax, or by printed form delivered to the appropriate office. This step completes the applicant's submission to the FAA.

At a block 121, the FAA formally receives the application and the compiled test results. The FAA or the FAADRO has the ability to review the inspection documentation and to either accept the inspection or annotate the inspection with request for amplification or further testing. Much of the conformity testing is in accord with the DER review at the block 115. It will be appreciated that the routine 100, though described in discrete steps, allows each of the reviewing authorities to simultaneously review the accumulated data as desired and to provide advisory opinions as the appropriate means to proceed.

When the FAA reviewing authority has approved the request for conformity, the routine 100 allows for notification of issuance of the approval within the database rather than by manual entry at a block 123. Otherwise, if appropriate, the FAA transmits the approval to the applicant and to the FAA DRO by e-mail, by fax, or by printed form delivered to the appropriate office at the block 123.

Upon receipt of the notice, at a block 125 the FAA DRO closes out the case and issues the approval. At a block 127, the notice goes out to all interested parties. Once again, the database 101 is enabled to transmit the forms to the parties by means of the Web-based interface. Otherwise, notice will be by e-mail, by fax, or by printed form delivered to the appropriate offices.

Figure 5:
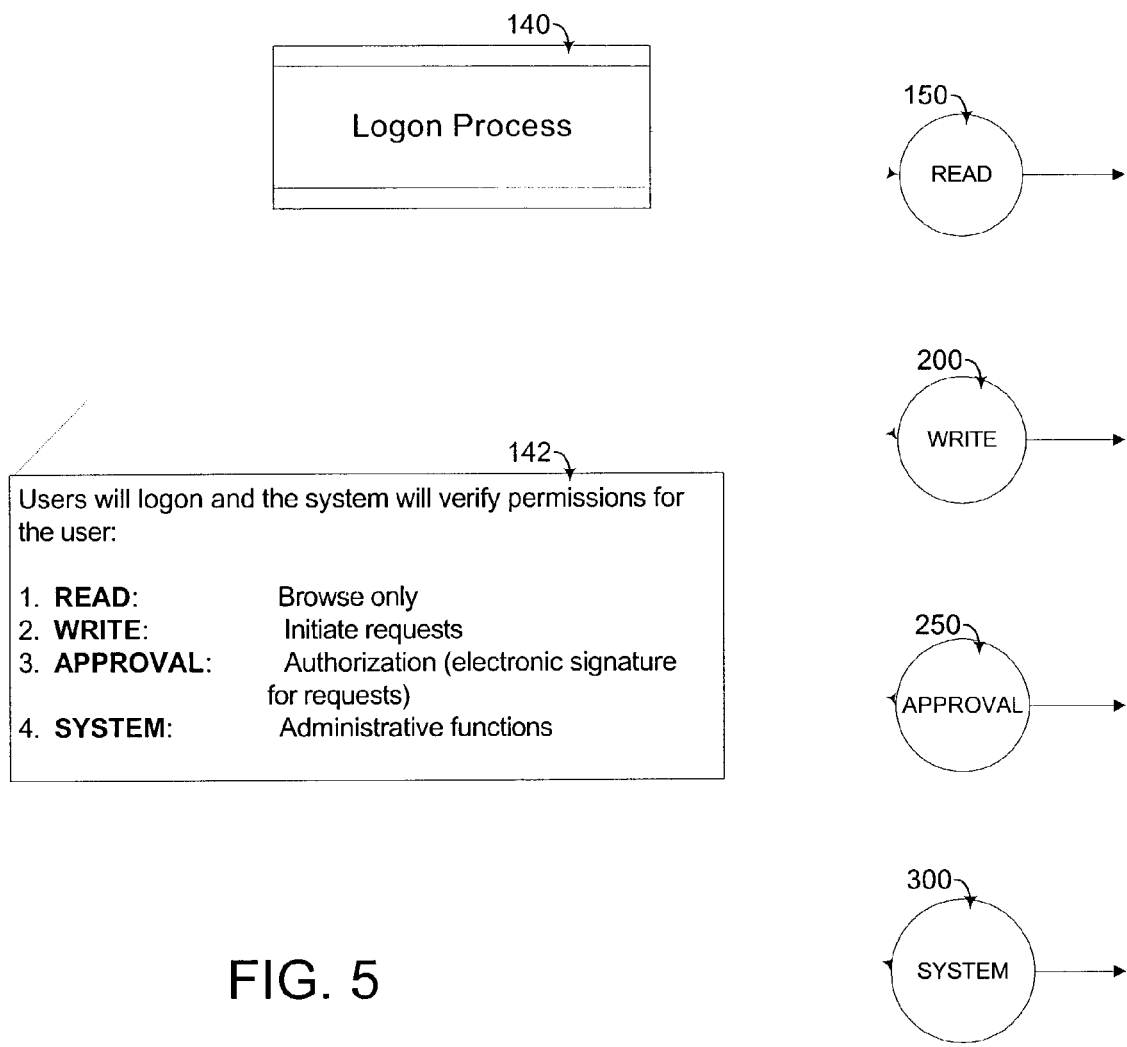
FIG. 5 shows a screen shot of the log-in page and the information necessary in one embodiment of that page.

Referring now to FIGS. 2, 3, and 5, the user logs into the system by means of a log-on procedure at a block 140. It will be readily appreciated by one skilled in the art that such a log-on procedure is well-known. In a preferred embodiment, the log-in screen is generated as an Active Server Page or "ASP"; in another preferred embodiment, the log-in screen conveys the log-in information to a remotely located component object model ("COM") object. As is known, an Active Server Page (ASP) is suitably an uncompiled program that includes one or more sets of code that are processed on a server before the page is sent to the user. As is also known, an ASP is a feature of the Microsoft Internet Information Server (IIS). But, because the server-side script is just building a regular HTML page on the server then feeding it to the web browser, the resulting display can be delivered to almost any browser. While use of an ASP is a presently preferred method, the functionality of a page might be accomplished by including a script written in VBScript or JScript in an HTML file or by using ActiveX Data Objects ("ADOs") program statements in the HTML file.

A presently preferred embodiment includes use of the server-side ASP rather than a client-side script. Although either might work, the server-side script will result in an easily displayable HTML page. It will be appreciated that client-side scripts (for example, with JavaScript) may not work as intended on older browsers or may result in performance degradation for loading the page. Sever-side script allows for greater control of variables in hardware or resident software that might otherwise affect the display of data stored on the network.

The log-in screen facilitates both security and selection of displayed content according to the identity of the user. Logging-in includes entering a user name and a password. This information is used at a block 142, in a preferred embodiment, to establish the identity of the user and thus to accord to the user security privileges and to tailor functionality of the ASP and invoke COM objects for those functions appropriate to the particular user. While not exhaustive, a list of functions, dependent upon the identity of a user, includes without limitation: allowing the user to make changes to documents while reviewing; defining a subset of documents accessible to a particular user; or directing a user to only those documents the user finds relevant results from identifying the user. The use of the log-in screen is not a necessary feature of the invention but is included to teach one embodiment of the invention.

When the information is fully entered, the user clicks on the continue object to proceed. In this embodiment, the COM object checks the variables against a look-up table defining security privileges and responds accordingly. The look-up table is one programmed by the responsible FAA Project Administrator. However, it would be understood by those skilled in the art that the validation of identity and/or privileges could be performed in other ways.

Having established a log-in identity for the user, the "Read" rights are granted consistent with the identity of the user. At the block 140, the user is offered only those actions consistent with the user's log-on identity. The privileges include one or more of "Read" at a block 150; "Write" at a block 200; "Approval" at a block 250; and "System" at a block 300 privileges. Each set of privileges is based upon the role of the user with regard to the certification process 60.

Figure 6:
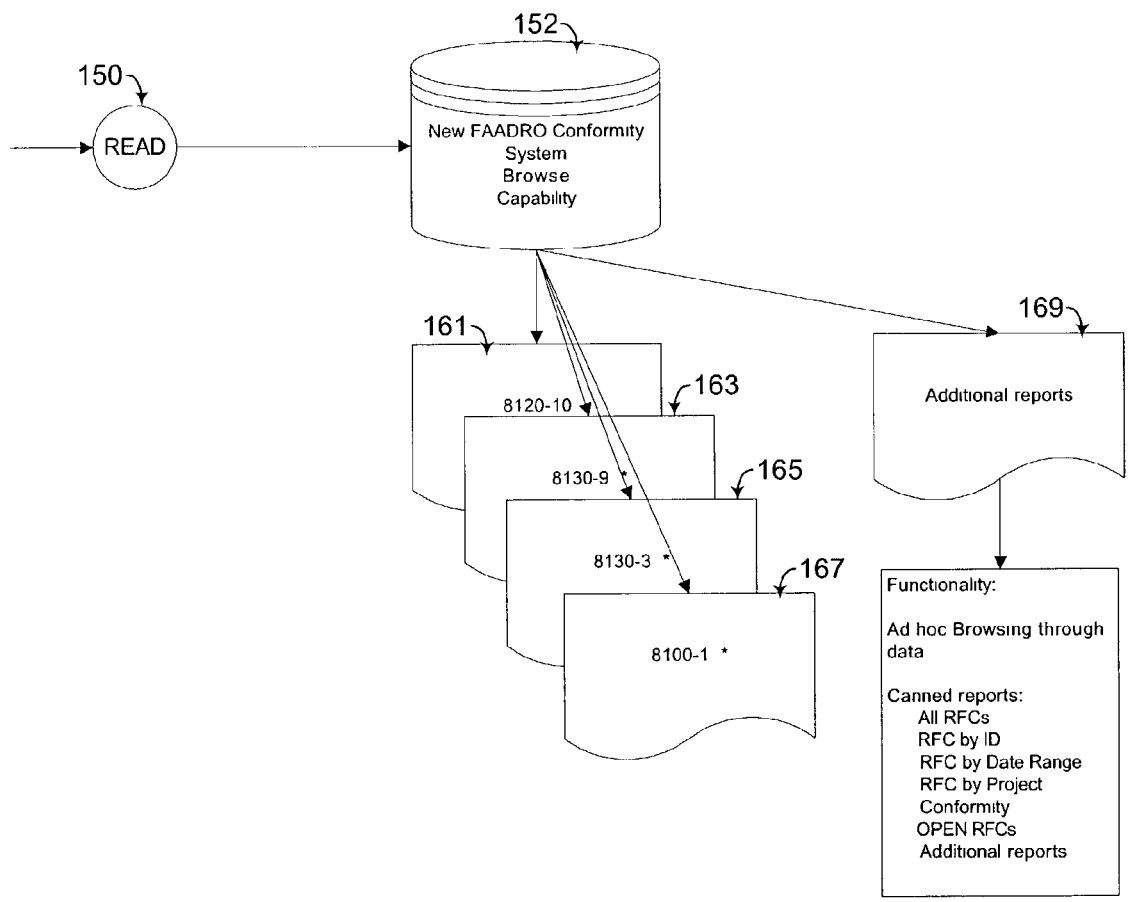
FIG. 6 is a graphic displaying the database and several exemplary reports produced.

Referring to FIGS. 4 and 6, the "Read" program allows browsing privileges. At the block 150, the system stores all of the data garnered in the course of the approval process in a database 152. The data is stored in a manner to allow the compiling of the several forms required by the FAA such as 8120-10 at a block 161, 8130-9 at a block 163, 8130-3 at a block 165, and 8100-1 at a block 167. The system is not limited only to the several reports required by the FAA. Additionally, at a block 169 the system will allow the review of the raw testing data on an ad hoc basis. The system not only allows the vertical examination of each individual RFC as it develops, but also, horizontal examination across several RFCs. For instance, the system can report out the RFCs by the identity of any interested party, inspector, delegate, representative, tester, or applicant. Another grouping might be by date of application, by project, or by status.

Browsing privileges for information stored in the database 152 are extended to all interested parties and the relevant RFCs include at least the following: the Applicant; FAADRO (FAA Designated Regulatory Office); Engineering Division/DER; FAA MIDO/MISO; FAA ACO (Air Certification Office); Manufacturer's Procurement Quality Assurance; Engineering Certification; FAA Manufacturer DMIRs; FAA CMO ASI's (Certificate Mgmt Aviation Safety Inspectors); FAA CAA (Civil Aviation Authority). From a single log-in any user may view those RFCs for which they have a role. The compilation of information across the several RFCs will also yield statistics to aid in the administration of the approval process 100.

Figure 7:
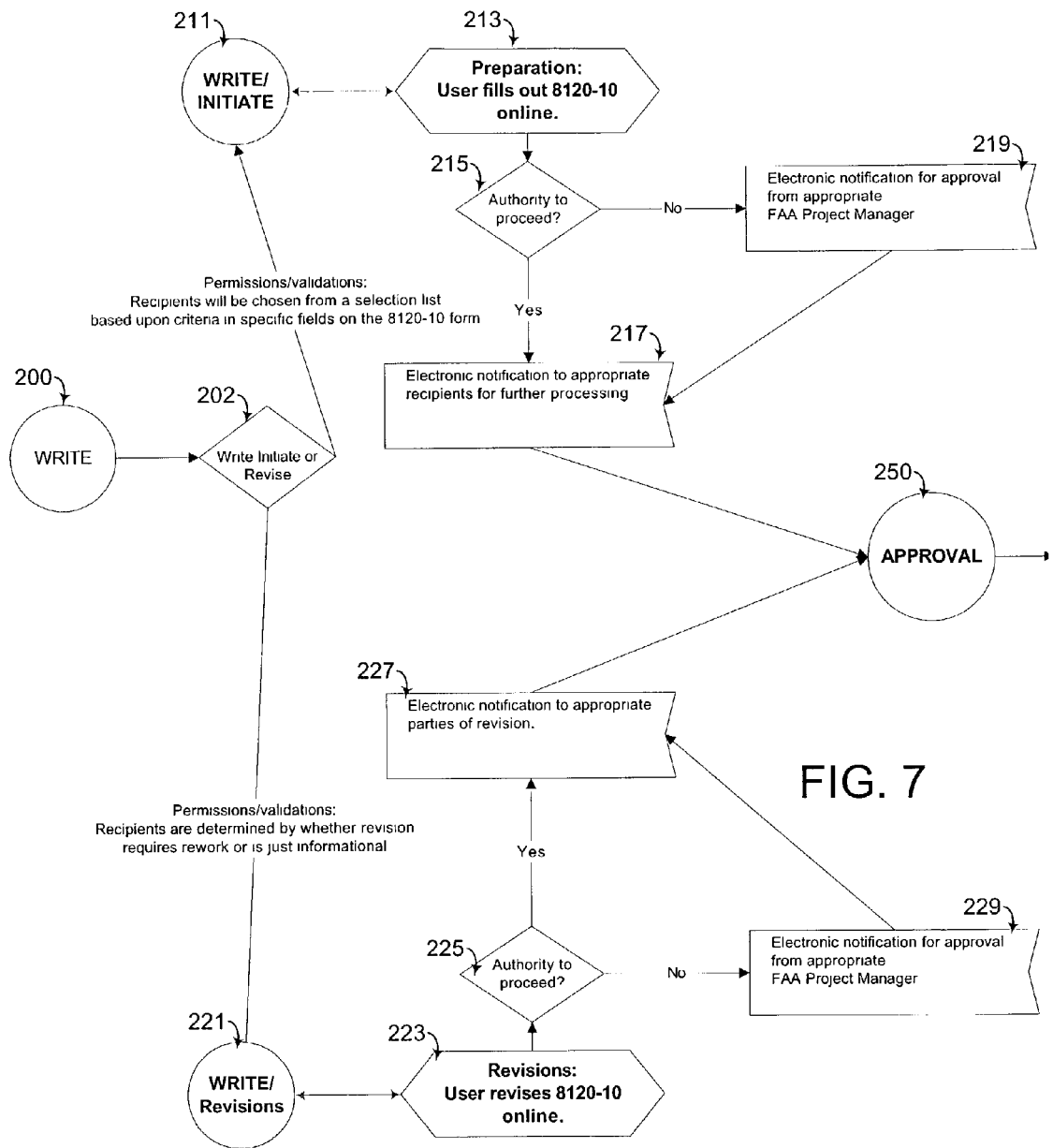
FIG. 7 is a flow chart showing the alternate paths of writing or revising an application.

Referring to FIG. 7, the group of parties granted the "Write" privilege at the block 200 is more tightly defined. Unlike the "Read" privilege which the system extends to each interested person, the "Write" privilege is extended only on a role-basis. For example, only a delegated tester can enter test results and even after a password-protected log-in, any data is additionally verified with a known electronic signature. Once logged in, either the system knows the role of the individual user vis-à-vis a particular application, or it poses the question. The system determines if the purpose of the user's access is to initiate a new RFC or to contribute information in an existing RFC at a block 202. The "Write" rights of the user are further attenuated if the user is accessing an existing application. At the block 202, the system will select the purpose of the log-on, either to initiate an 8120-10 application at a block 211, or to revise the application at a block 221.

Where a user logs-on as an applicant at the block 200, the system decides at the block 202 that the user has the ability only to enter or modify data in selected fields appropriate for a new application. Given an application in either the "initiate" or "revise" state at blocks 211 or 221 respectively, the user's first action at either blocks 213 or 223 respectively will be an interaction with one or another field on the 8120-10 field. The actions in the field are compared to the privileges at either of blocks 215 or 225 respectively. An FAA Project Administrator will identify each of the roles and the accorded privileges. The relationship between role and privilege is programmable.

Subsequent to the completion of the application fields of the 8120-10 with sufficient specificity to initiate an application, the system locks the applicant out of these same fields, except to amplify the data with further explanation. The system thereby prevents confusion of the design or definition of the component or system under examination. Similarly, a tester is not allowed to initiate an application. All interaction with the system is qualified by the role of the user and the ability of the user to electronically sign off on the revisions. The method of electronic signatures is well-known in the art. Where revisions are allowed according to the privileges accorded the user, at either block 217 or 227 respectively, the appropriate parties, as defined by the FAA Project Administrator to correspond with a given field on the 8120-10, will receive notice by e-mail, by fax, or by printed form delivered to the appropriate office. Once logged in by the DRO, no one is allowed to change the record, unless the DRO returns to the requesting DER for revision.

On occasion, a user will attempt to make revisions to fields outside of the privileges the FAA Project Administrator accords that user. At either of blocks 217 or 227, the system determines that the entry or revision of the entry on the 8120-10 exceeds the user's privileges. Rather than to flatly reject the information, the system will accept the entry or revision and then, at either block 219 or 229, the FAA Project Administrator is notified of the attempted entry or revision. After examining the entry, the FAA Project Administrator may approve the entry or revision, sending the system to either block 217 or 227 respectively. The system then notifies the interested parties at blocks 219 or 229, as though the entry had been according to the original privileges.

Figure 8:
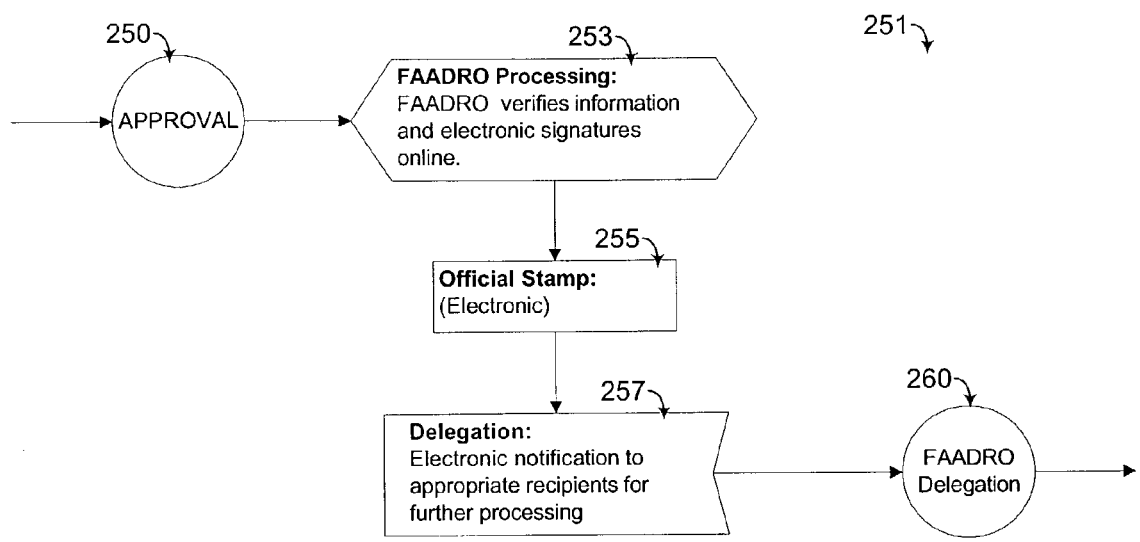
FIG. 8 is a flow chart showing the approval step.

Turning now to FIG. 8, the FAA Designated Regulatory Office (DRO) officially receives the 8120-10 for approval at the block 250 in a receiving process 251. The FAA delegates its responsibility to determine whether parts "conform" and to manage this process on behalf of the FAA to the DRO. At a block 253, the DRO confirms that all of the information on the 8120-10 is from the appropriate source and is suitably verified by electronic signature. To acknowledge the official receipt of the application, at a block 255 the DRO electronically stamps the application received on that date. The electronic stamp at the block 255 supplants the ink stamp of the manual process and commences the FAA responsibility for processing the application. At this point in the process, the part, component, installation, or aircraft has been nominated for certification. Testing now begins.

Figure 9:
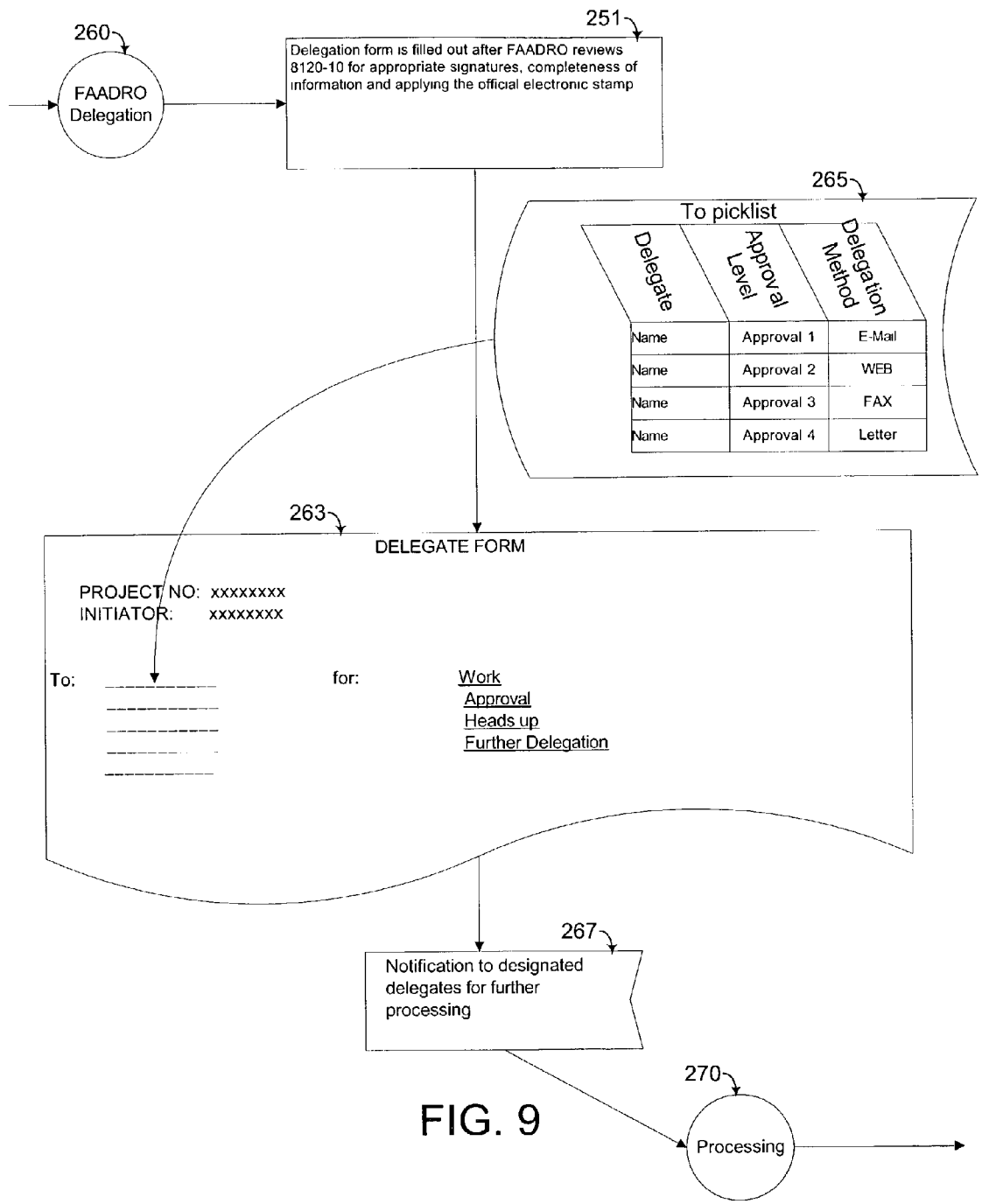
FIG. 9 is a flow chart showing the assignment of delegated tasks in the approval process.

At block 257, the DRO notifies appropriate parties, testers, inspectors, and the applicant indicating the availability of the received 8120-10 for testing and inspection. The formal delegation begins at a block 260. Referring to FIG. 9, after the receiving process 251, the FAA working with the applicant, will delegate the individual testing of each part, component, installation, or aircraft to an appropriate and approved inspector. This is an iterative process and depending upon what type of request, the delegation could happen several times on a single 8120-10 application. Each delegation is based upon the FAAs continued need for certification based upon the FAA expertise and sufficiency of testing. On the 8120-10, in its online form 265, in the appropriate field, the FAA DRO delegates the work by a drop-down list (in one preferred embodiment), selecting from the supplied names stored on a pick list at a block 263. Upon delegation at a block 265, the notification is sent to the interested parties by e-mail, by fax, or by printed form delivered to the appropriate office. The delegates begin their work as the application enters the processing phase at a block 270.

Figure 10:
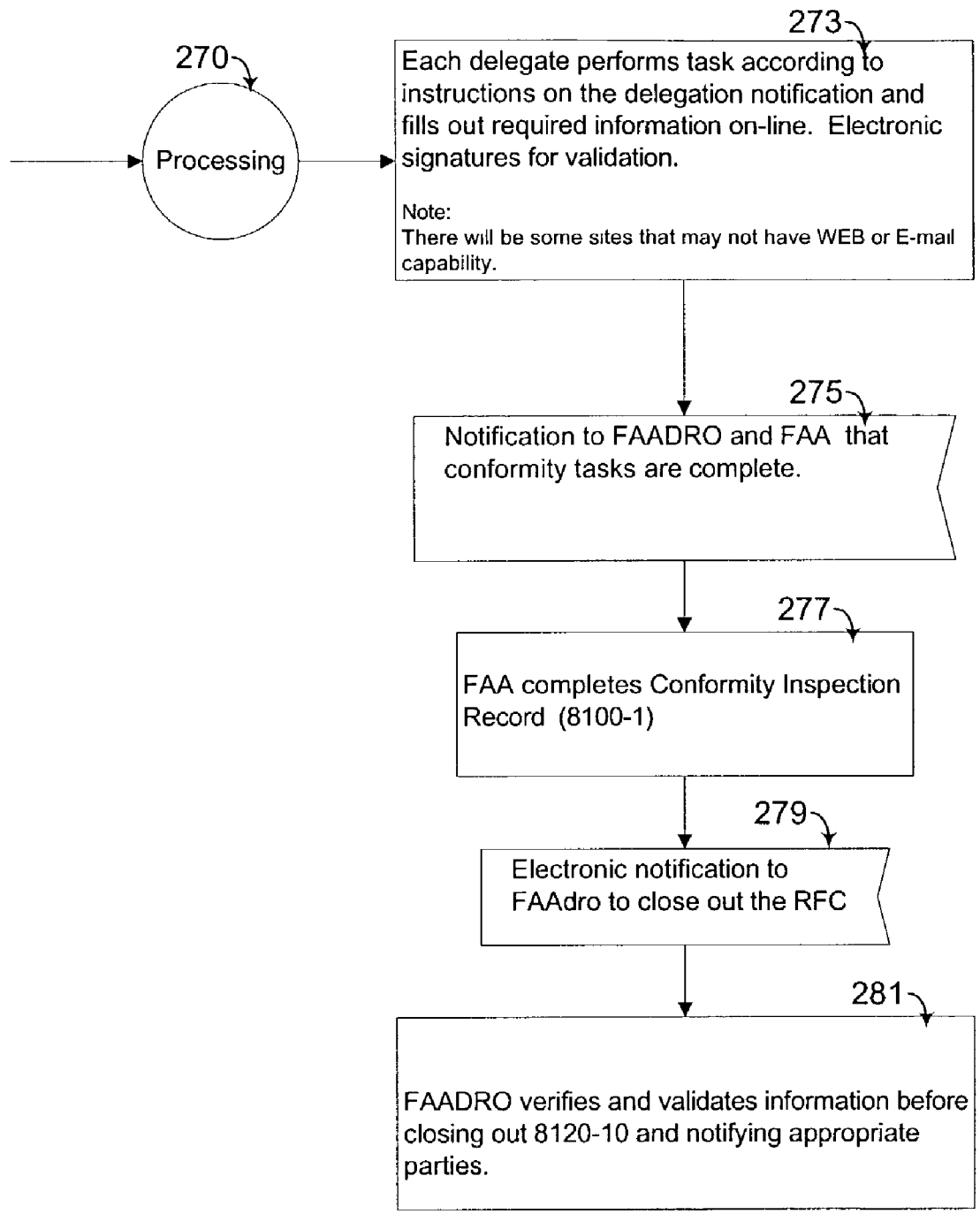
FIG. 10 shows a flow chart showing the receiving of results of delegated tasks in the approval process.

The testing or inspection happens at the block 273, not the delegating by the DRO. Referring to FIG. 10 at a block 273, each individual delegate performs appropriate testing or inspection as the FAA DRO has delegated. The delegate records the results of testing or inspection in an on-line embodiment of the 8120-10 form. Alternatively, the delegate can transmit the results to the FAA DRO for entry by suitable means. In any regard, upon entry of the results, the system notifies the FAA and the FAA DRO of the completion of the delegated tasks. If so programmed by the FAA Project Administrator, the system will also notify the applicant. The notification is automatically sent to the interested parties by e-mail, by fax, or by printed form delivered to the appropriate office.

The FAA now may exercise its "Read" privileges as set forth above. By the "Read" function, the FAA reviews the results of testing and inspection and, if suitable, completes the conformity inspection record, FAA form 8100-1 at a block 275. Concurrently, at a block 277, the FAA issues an approval, notifying the FAA DRO of the approval. This causes the FAA DRO to verify the information contained in the FAA form 8100-1 to close out the 8120-10 at a block 279. If additional testing is necessary, the FAA returns to the delegation screen portrayed at the block 263 in FIG. 9. The process loops until the FAA can issue the 8100-1 at a block 275 or the applicant abandons the process.

Figure 11:
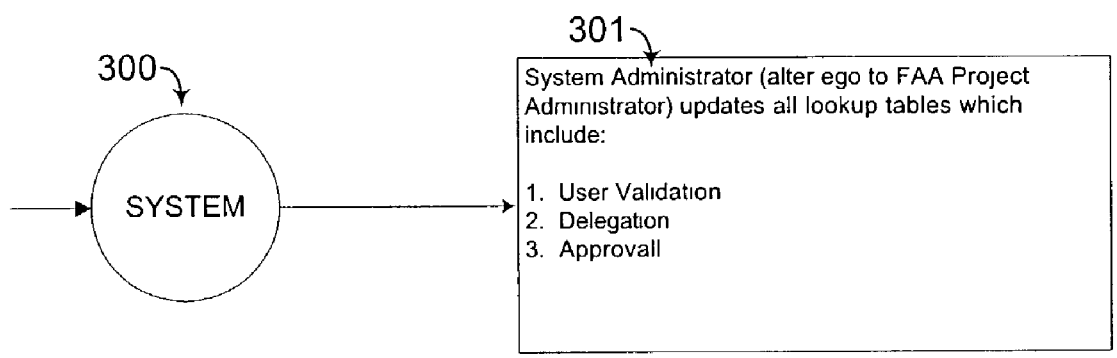
FIG. 11 shows the existence of an administrator facility.

Referring to FIG. 11, administering the process at a block 300 includes administering the rights set out in a block 301. As has been indicated throughout the above discussion, the FAA Project Administrator will have rights to dynamically modify the look-up table for persons and their corresponding privileges. The Project Administrator may well offer distinct rights to each of the interested persons with regard to each distinct 8120-10 processed through the system.

Figure 12:
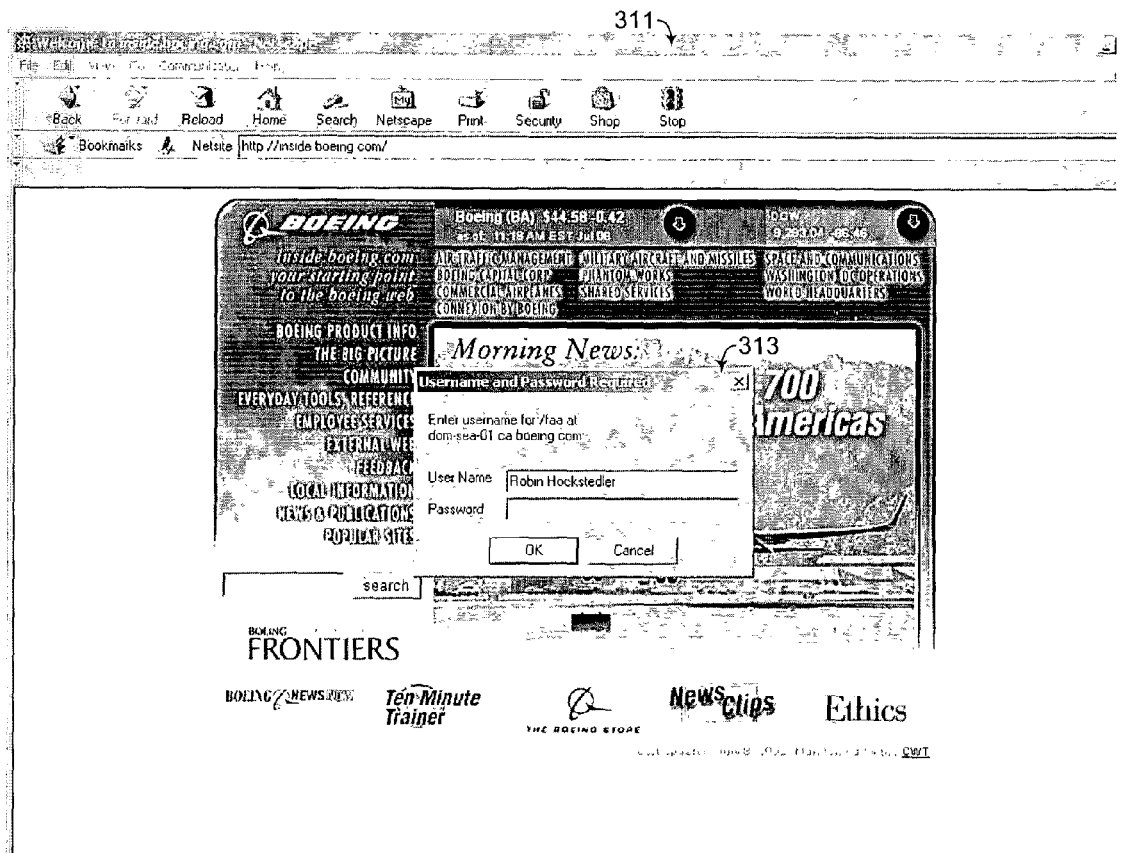
FIG. 12 is a screen shot of the log-in process.

Referring to FIGS. 2, 3, and 12, the inventive application resides on the server 7. When the client 11 directs its browser to the address on the server 7, the application invokes a log-in dialogue box 313. The log-in dialogue box 313 allows the user to log-in, identifying the user for the system, using a log-in table that the FAA Project Administrator assembles to grant security privileges with respect to each document as discussed above. A standard browser allows the display of a status line 315 informing the user of the log-in. These screens portray the log-in by way of non-limiting example. The log-in dialogue box 313 allows a user to initiate a log-on process by means appropriate to the browser, and when the system discerns an identity, it sends the user to a distinct URL on the server 7 to initiate the "Read" process if the user is an applicant.

Figure 13:
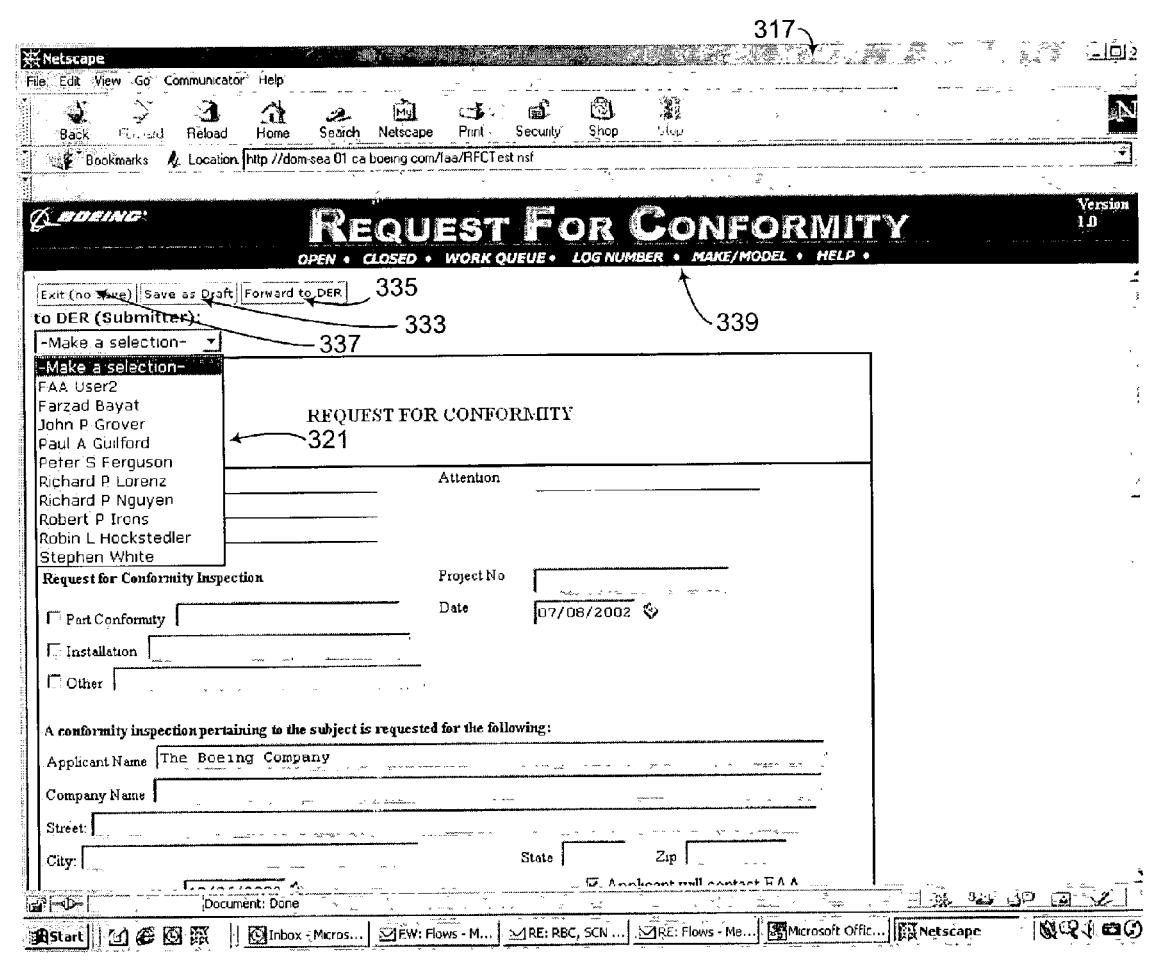
Figure 14:
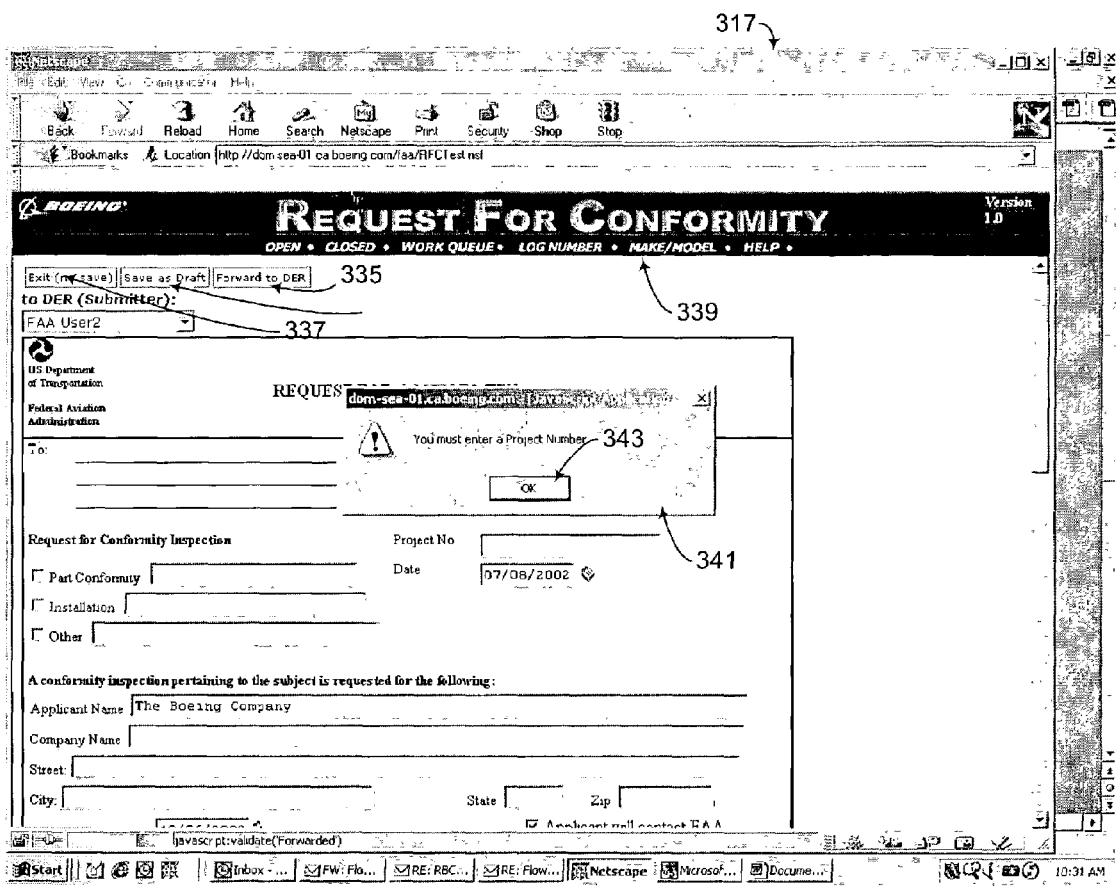
FIG. 14 is a screen shot of the interactive display of an 8120-10 form displaying a dialogue box indicative of a violation of entry business rules.
Figure 16:
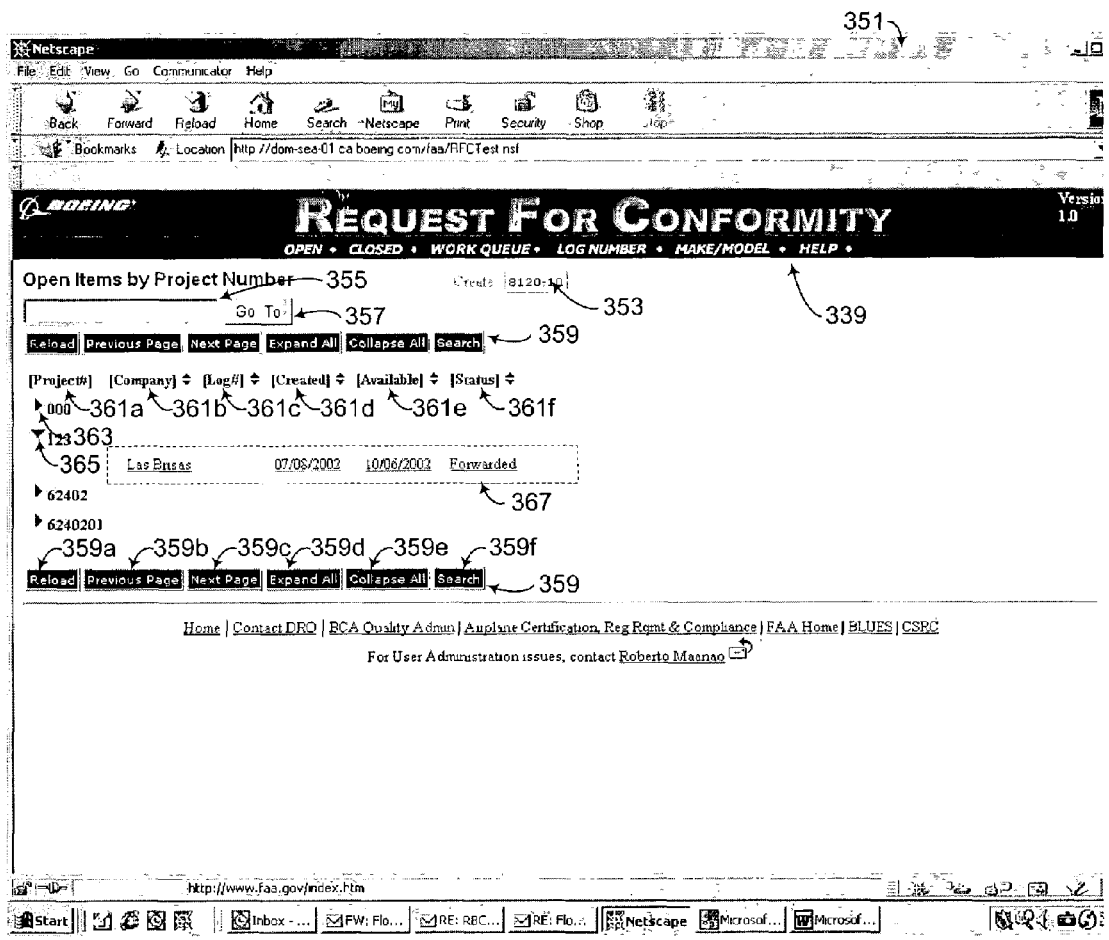
FIG. 16 is a screen shot of the interactive display of a listing of several forms 8120-10 and the navigation bars to facilitate movement among the several forms.

The first screen of the "Read" process is portrayed in FIGS. 13 and 14. While configured to resemble the FAA required 8120-10 form, the form is interactive. The interactivity of the form is accomplished generally by means of a Graphic User Interface ("GUI") through a process known as "clicking on" a graphic object which action initiates the execution of the program. As is well-known, "clicking on" refers to moving a screen pointer to a graphic point of a screen and there activating a button on a mouse. Clicking on a point within a page displayed by the browser might also activate a link that causes the browser to display a page located at a distinct URL. Regardless of the purpose of the log-in, in the presently preferred embodiment of the invention, the 8120-10 page is the initial splash screen.

Elements of the splash screen are present that enable navigation within the process. Most apparent among the elements are two navigation bars. The first of these is a "status reports" bar 339. The status reports bar allows one to sort 8120-10 applications and to compile reports relating to the whole of the group of 8120-10s within the system database. These reports, earlier characterized as "horizontal" as they report status across a number of 8120-10 applications, aid the interested parties in gauging the status of a constellation of 8120-10s. For instance, the DER can check on its statistics as it performs its assigned duty attendant to its delegation status.

The legends on the several buttons within the "status reports" navigation bar 339 are indicative of the screens the system will generate in response to clicking on the button. Clicking on "Open" produces an interactive display of the titles of all currently pending 8120-10 applications within the system (Interactive in that clicking upon any title will allow the review of that currently application in an interactive display similar to that of the splash screen shown here in FIG. 13). Clicking on "Closed" produces a report similar to that produced by clicking on "Open," but the report will only portray the completed 8120-10s stored in the system.

Clicking on "Work Queue" will portray all of the 8120-10s currently pending in the order of the work currently assigned to delegates. A delegate logging on would see all of the work currently required of the delegate in the order the FAA expects it to be completed in alphabetical order. Clicking on "Log Number" reorganizes all 8120-10s regardless of status in order of their FAA-assigned log numbers. Clicking on "Make or Model" reorganizes all of the 8120-10s in relation to the particular hardware for which the applicant is seeking conformity sorted by tail number, e.g. 707, 727, 737, 757 etc. Finally, clicking on "Help" will yield context sensitive help with options to peruse and select topics from an index or to search for topics based upon a keyword.

The second navigation bar (including a series of buttons 333, 335, and 337) allows manipulation of the currently displayed 8120-10. Presuming that the user has accessed the relevant 8120-10 by means of the buttons on the first navigation bar, the user may now select actions for work upon the form by means of the second navigation bar. The second navigation bar includes buttons with legends "Save as Draft" 333, "Forward to DER" 335, and "Exit (No Save)" 337. Clicking on the "Save as Draft" legend 333 presumes that there has been some data entry. The user creates the form and completes as much information as possible—the system business rules require they at least enter a Company Name in that field and Project Number in that field so the form can be located by sorting on either field in the database once it is saved. The interactive 8120-10 portrayed includes a plurality of data fields (such as a "Submitter" field 321).

Each of these fields allows the user to enter data according to rules set by the FAA Project Manager or those programmed in accord with the FAA Project Administrator's directives or in accord with common usage. The fields correspond to the questions posed by the standard 8120-10 in paper form. As is shown, by example in FIG. 13, the Submitter field 321 includes a drop-down list limiting the identity of the submitter to those consistent with the log-in identity of the user. The rules enable the user to quickly and to accurately fill the form with the relevant data. Each rule corresponds with a particular field. On this system, the number of authorized submitters is limited and their identities are known. Where a user may begin to complete an 8120-10 but has not completed entry to an extent that it is ready for submission, the user can store the file on the system in association to that user for later completion by clicking on the "Save as Draft" button 333.

Clicking on the "Forward to DER" button 335 sends the 8120-10 by suitable means, as discussed above, to the Designated Engineering Representative so long as the suitable information in the form is complete. Rules within the system prevent submission of incomplete forms to the DER. Clicking on the "Forward to DER" button 335 initiates an examination of the form before sending, testing if the minimum data necessary for a useful 8120 is present. Such is done by comparison to expected forms of the data in each field available. Where the data is not suitably complete, the process displays the incomplete fields, offering the user the opportunity to complete each field with suitable data.

FIG. 14 portrays an example of application of a rule: there must be a project number. Where omitted, upon clicking the "Forward to DER" button 335, the system detects the absence of a suitable project number and generates a dialogue box 341. Clicking on an "OK" button 343 causes the system to direct the user's browser to display the "Project Number" field for the user's suitable completion. Upon the completion of the "Project Number" field, the user can re-click on the "Forward to DER" button 335 to attempt to resend the information.

In one preferred embodiment of the invention, upon completion of all data fields associated with an initial application and clicking of the "Forward to DER" button 335, the system examines the identity of the user for suitable rights. If suitable "Write" privileges do exist, the system stores the form and notifies the DER of the submission. In another preferred embodiment, the drafter has access to edit the request with revisions prior to re-submittal.

Figure 15:
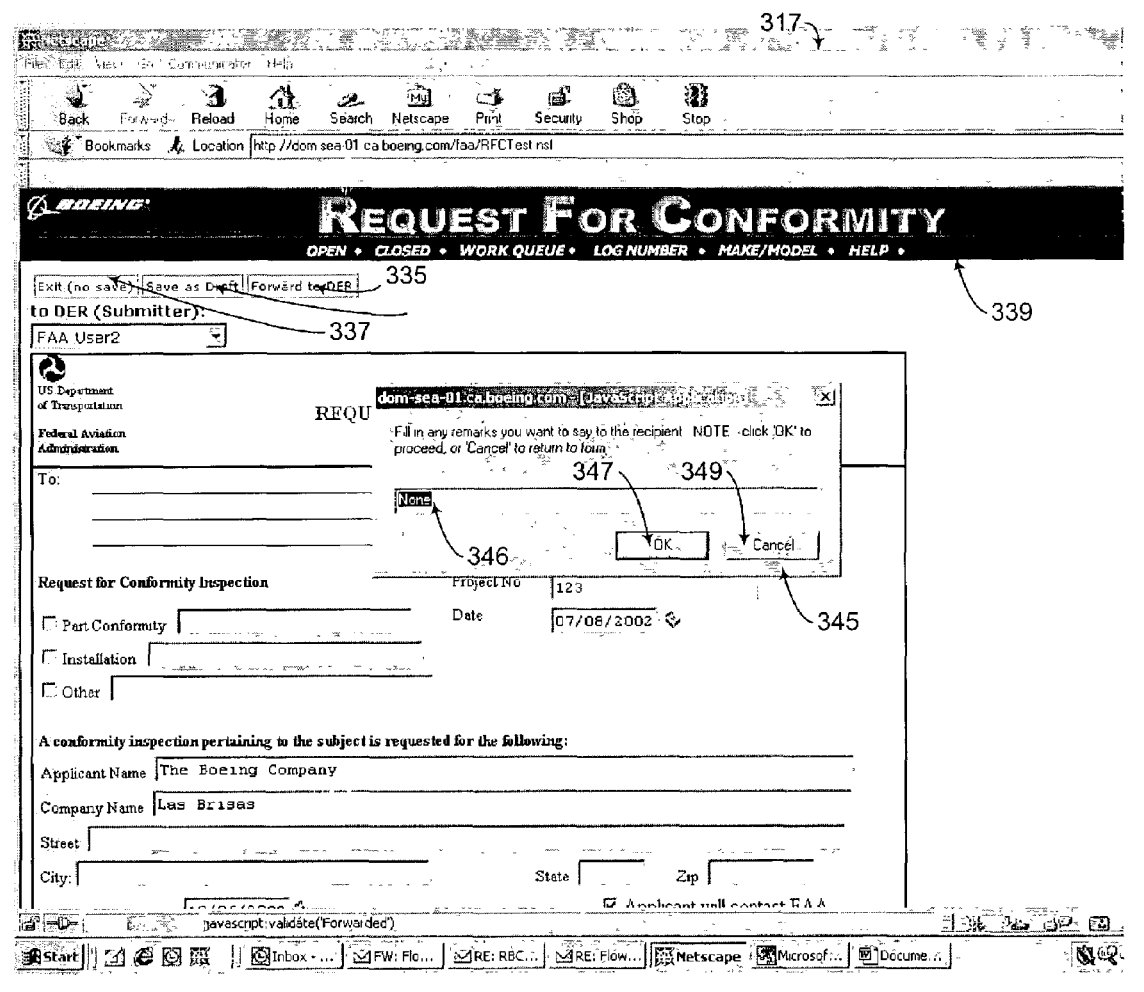

Along with the notification, the user is allowed to insert remarks that would not be appropriately included within the fields of the 8120-10. FIG. 15 shows a "Remarks" dialogue box 345 invoked by the process. Remarks can be added in a Remarks Window 346. The User may then send the notification along with the remarks in the Remarks Window 346 by clicking on an "OK" button 347. If electing to send without remarks, the user can click upon a "Cancel" button 349, thereby sending the notification. Upon sending, the drafter loses revision rights on that 8120-10, reverting to only "Read" rights with respect to that particular 8120-10 application. At the same time, the DER receives "Revision" rights allowing the DER to assemble the data necessary to complete the 8120-10 and to submit it to the DRO office.

Referring to FIGS. 2, 3, 12, and 16, the application invokes a log-in dialogue box 313. The log-in dialogue box 313 allows the user to log-in, identifying the user for the system. Where the system discerns that a DER has logged in, the server 7 directs the browser to a distinct URL containing a distinct splash screen. An exemplary splash screen 351, by way of non-limiting example, is portrayed in FIG. 16. To direct the browser, instead, to the first screen of the "Read" process as portrayed in FIG. 13, there exists a "Create 8120-10" button 353. On the other hand, the DER may use the screen 351 and its navigation bars to review the existing 8120-10s currently in the system.

To identify a pending 8120-10 for revision, the logged-in DER may simply type the number the system assigns to a transmitted 8120-10 in a window 355 and then click on a "Go to" button 357. In response, the system will retrieve the application, compare the identity of the logged-in DER to the identities allowed "Revision" privileges or, alternatively, "Read" privileges for the document in question. The system opens the 8120-10 in a screen similar to the first screen of the "Read" process as portrayed in FIG. 13, and accords privileges consistent with those allowed.

The screen 351 includes two instances of a navigation bar 359 that allow movement among the several 8120-10s on the system. The navigation bar 359 includes buttons with legends "Reload" 359a, "Previous Page" 359b, "Next Page" 359c, "Expand All" 359d, "Collapse All" 359e, and "Search" 359f. Clicking on the "Reload" button 359a will reload the listing of the 8120-10s in the system redirecting the browser to the top of the listing. Clicking on the "Company" button 361b will resort the 8120-10s presenting the listing sorted by the company name of applicants. Similarly, clicking on any of the "Log#" 361c, "Created" 361d, "Available" 361e, and "Status" 361f buttons will cause the system to perform a similar sort and to present the results according to attributes of the 8120-10s, such as a log number assigned by the FAA, a date the file was created in the system, a date the file became available to the DER for review, and the current status of the 8120-10 in the course of the application process, respectively.

Figure 17:
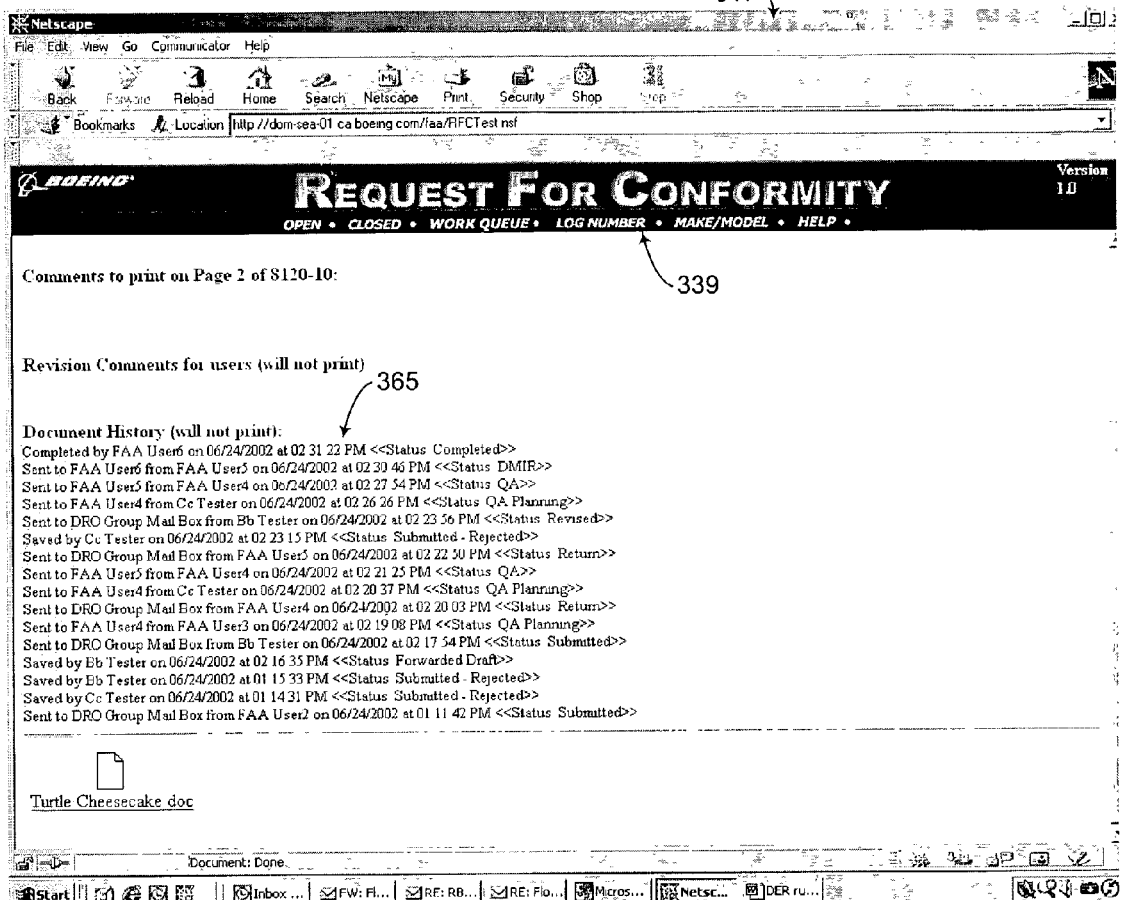
FIG. 17 is a screenshot of the history of an exemplary form 8120-10 as it progresses through the invention set forth herein.

Once sorted, the results are displayed on the screen 351 in "directory tree" fashion under a bar of attribute headings including "Project Number" 361a, "Company Name" 361b, "Log#" 361c, "Created" 361d, "Available" 361e, and "Status" 361f. Each file, such as that displayed with name of the submitting company "Las Brisas" 367, are shown with the corresponding attributes. By way of non-limiting example, where the 8120-10s are displayed in project number order, the system will create headings such as a heading for "000" 363 as a natural break in the list of numbers, in this case, at the origin. The logged-in DER can expand the list between any two of the natural breaks by clicking on the heading preceding a number of interests. In this case, clicking on the heading "000" 363, has caused the system to display the subheading "123" 365 corresponding to a file with Project Number "000,123" and displayed with name of the submitting company "Las Brisas" 367. By any described means, the DER is brought to the record for a desired 8120-10 and allowed to revise it according to the privileges accorded the DER. The system opens the 8120-10 in a screen similar to the first screen of the "Read" process as portrayed in FIG. 13, and accords privileges consistent with those allowed the DER with regard to that document. For instance, when the system opens the 8120-10 in a screen similar to the first screen of the "Read" process as portrayed in FIG. 13, the system also contains a link to evoke a history screen associated with the application. FIG. 17 shows the history 365 of an exemplary 8120-10, as it might for the attendant forms necessary to complete the 8120-10. This feature allows an interested party to track the progress on each form. The status of the form is displayed in the open view of the database.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An automated method for facilitating regulatory certification of an aircraft system, the method comprising:
   providing a certification process database on a server accessible by a user, a certification authority, and one or more third parties;
   granting the user access to the certification process database on the server, including:
      downloading a request form to request a certification process;
      entering information regarding one or more components that require a certification activity into the request form; and
      uploading the request form including the entered information into the certification process database;

upon receipt of the uploaded request form, the certification process database automatically transmitting a request notification to at least the certification authority;

upon receipt of the request notification, the certification authority responding to the request notification, including:

identifying at least one appropriate third party to provide the certification activity based on the request form including the entered information;

assigning one of the at least one identified appropriate third party as an assigned representative to perform the certification activity; and uploading information regarding the assigned representative into the certification process database;

upon receipt of the uploaded information regarding the assigned representative, the certification process database automatically transmitting an assignment notification to the user and to the assigned representative;

upon receipt of the assignment notification, granting the assigned representative access to the certification process database, including:

downloading the request form including the entered information from the certification process database;

approving a test plan for testing the one or more components, the testing being configured to provide test data suitable to qualify the one or more components under the certification activity;

approving test data resulting from the testing of the one or more components; and uploading a certification recommendation into the certification process database;

upon receipt of the certification recommendation, the certification process database automatically transmitting a recommendation notification to at least the certification authority and the user;

upon receipt of the recommendation notification, the certification authority performing dispositional activities including:

downloading the certification recommendation from the certification process database;

reviewing at least a portion of the certification recommendation; and uploading a certification disposition into the certification process database; and upon receipt of the certification disposition, the certification process database automatically transmitting a disposition notification to at least the user and the assigned representative.

2. The method of claim 1, further comprising:
receiving performed certification activity from the identified appropriate party;
compiling the performed certification activity into a report; and
generating an interactive display of the compiled report for review.

3. The method of claim 1, wherein the certification activity comprises at least one of testing, demonstrating, simulating, analyzing, or inspecting.

4. The method of claim 3, wherein the certification activity certifies in accord with one or more of federal regulations.

5. The method of claim 1, wherein upon receipt of the uploaded request form, the certification process database automatically locks the user out of the uploaded request form except to amplify the entered information with further explanation.

6. The method of claim 1, wherein uploading the request form further includes:
the certification process database automatically examining the request form that is proposed to be uploaded by the user for sufficiency; and
if sufficiency is not satisfied, requiring additional information to be entered by the user prior to uploading of the request form into the certification process database.

7. The method of claim 2, wherein compiling the performed certification activity includes identifying and compiling certification deliverables based on determined applicable components and associated scopes of work.

8. The method of claim 1, further comprising:
checking a privilege of the user to make revisions to the request form; and
when the user attempts to enter or revise an entry to the request form that is beyond the privilege of the user, the certification process database temporarily stores the attempted entry or revision, notifies the certification authority of the user's attempted entry or revision that is beyond the privilege of the user, and if the certification authority approves, allows the attempted entry or revision to be permanently uploaded to the request form stored in the certification process database.

9. The method of claim 2, wherein entering the one or more components is by means of a Web-based browser, and wherein receiving the performed certification activity is by means of the Web-based browser.

10. The method of claim 2, wherein compiling includes compiling a history of the performed certification activity into a history report, and wherein generating includes generating the interactive display of the compiled history report for review.

11. A computer-based apparatus for generating reports necessary for certification of a system, the apparatus comprising:
an input interface for entering one or more components that require certification activity;
a memory configured to store a certification process database accessible by a user, a certification authority, and one or more third parties; and
a processor coupled to the input interface and the memory, the processor executing instructions that perform a method including:
granting the user access to the certification process database, including:
downloading a request form to request a certification process;
entering information regarding one or more components that require a certification activity into the request form; and
uploading the request form including the entered information into the certification process database;
upon receipt of the uploaded request form, the certification process database automatically transmitting a request notification to at least the certification authority;
upon receipt of the request notification, the certification authority responding to the request notification, including:
identifying at least one appropriate third party to provide the certification activity based on the request form including the entered information;
assigning one of the at least one identified appropriate third party as an assigned representative to perform the certification activity; and uploading information regarding the assigned representative into the certification process database;

upon receipt of the uploaded information regarding the assigned representative, the certification process database automatically transmitting an assignment notification to the user and to the assigned representative;

upon receipt of the assignment notification, granting the assigned representative access to the certification process database, including:

downloading the request form including the entered information from the certification process database;

approving a test plan for testing the one or more components, the testing being configured to provide test data suitable to qualify the one or more components under the certification activity;

approving test data resulting from the testing of the one or more components; and uploading a certification recommendation into the certification process database;

upon receipt of the certification recommendation, the certification process database automatically transmitting a recommendation notification to at least the certification authority and the user;

upon receipt of the recommendation notification, the certification authority performing dispositional activities including:

downloading the certification recommendation from the certification process database;

reviewing at least a portion of the certification recommendation; and uploading a certification disposition into the certification process database; and upon receipt of the certification disposition, the certification process database automatically transmitting a disposition notification to at least the user and the assigned representative.

12. The apparatus of claim 11, wherein the processor further includes:
a third component configured to receive performed certification activity from the assigned identified party; and
a fourth component configured to compile the performed certification activity into a report.

13. The apparatus of claim 12, further comprising a display device configured to display an interactive display of a the compiled report for review.

14. The apparatus of claim 11, wherein the method further includes, upon receipt of the uploaded request form, the certification process database automatically locks the user out of the uploaded request form except to amplify the entered information with further explanation.

15. The apparatus of claim 11, wherein certification is in accord with government regulations.

16. The apparatus of claim 11, wherein uploading the request form further includes:
the certification process database automatically examining the request form that is proposed to be uploaded by the user for sufficiency; and
if sufficiency is not satisfied, requiring additional information to be entered by the user prior to uploading of the request form into the certification process database.

17. The apparatus of claim 11, wherein the input interface includes a Web-based browser.

18. The apparatus of claim 12, wherein the method further includes:
checking a privilege of the user to make revisions to the request form;

when the user attempts to enter or revise an entry to the request form that is beyond the privilege of the user, the certification process database temporarily stores the attempted entry or revision, notifies the certification authority of the user's attempted entry or revision that is beyond the privilege of the user, and if the certification authority approves, allows the attempted entry or revision to be permanently uploaded to the request form stored in the certification process database.

19. The apparatus of claim 11, wherein the system is an aircraft, wherein the input interface includes means for entering affected aircraft model type and wherein a first component identifies parties further based on the affected aircraft model type.

20. The apparatus of claim 12, wherein the fourth component identifies and compiles certification deliverables based on determined applicable components.

21. The apparatus of claim 20, wherein the fourth component farther includes means for identifying government forms associated with the identified deliverables.

22. A computer readable media that contains instructions that, when executed by a computer, perform a method of certifying system, the method comprising:
granting a user access to a certification process database, the certification process database being accessible by the user, a certification authority, and one or more third parties, wherein the access includes:
downloading a request form to request a certification process;
entering information regarding one or more components that require a certification activity into the request form; and
uploading the request form including the entered information into the certification process database;
upon receipt of the uploaded request form, the certification process database automatically transmitting a request notification to at least the certification authority;
upon receipt of the request notification, the certification authority responding to the request notification, including:
identifying at least one appropriate third party to provide the certification activity based on the request form including the entered information;
assigning one of the at least one identified appropriate third party as an assigned representative to perform the certification activity; and
uploading information regarding the assigned representative into the certification process database;
upon receipt of the uploaded information regarding the assigned representative, the certification process database automatically transmitting an assignment notification to the user and to the assigned representative;
upon receipt of the assignment notification, granting the assigned representative access to the certification process database, including:
downloading the request form including the entered information from the certification process database;
approving a test plan for testing the one or more components, the testing being configured to provide test data suitable to qualify the one or more components under the certification activity;
approving test data resulting from the testing of the one or more components; and
uploading a certification recommendation into the certification process database;

upon receipt of the certification recommendation, the certification process database automatically transmitting a recommendation notification to at least the certification authority and the user;

upon receipt of the recommendation notification, the certification authority performing dispositional activities including:
- downloading the certification recommendation from the certification process database;
- reviewing at least a portion of the certification recommendation; and
- uploading a certification disposition into the certification process database; and upon receipt of the certification disposition, the certification process database automatically transmitting a disposition notification to at least the user and the assigned representative.

23. The computer-readable media of claim 22, wherein the method further includes, upon receipt of the uploaded request form, the certification process database automatically locks the user out of the uploaded request form except to amplify the entered information with farther explanation.

24. The computer-readable media of claim 22, wherein the certification activity comprises at least one of testing, demonstrating, simulating, analyzing, or inspecting.

25. The computer-readable media of claim 22, wherein uploading the request form farther includes:
- the certification process database automatically examining the request form that is proposed to be uploaded by the user for sufficiency; and
- if sufficiency is not satisfied, requiring additional information to be entered by the user prior to uploading of the request form into the certification process database.

26. The computer-readable media of claim 22, wherein the method further includes:
- checking a privilege of the user to make revisions to the request form;
- when the user attempts to enter or revise an entry to the request form that is beyond the privilege of the user, the certification process database temporarily stores the attempted entry or revision, notifies the certification authority of the user's attempted entry or revision that is beyond the privilege of the user, and if the certification authority approves, allows the attempted entry or revision to be permanently uploaded to the request form stored in the certification process database.

27. The computer-readable media of claim 23, wherein the system is an aircraft, wherein the method further includes receiving an entry of aircraft model type, and wherein the certification authority responding to the request notification is based on the entered aircraft model type.

28. The computer-readable media of claim 27, wherein the method further comprises certifying deliverables based on determined applicable components.

29. The computer-readable media of claim 28, wherein the method further comprises identifying government forms associated with the deliverables.

* * * * *